United States Patent [19]

Dowling

[11] 3,885,098

[45] May 20, 1975

[54] DIGITALIZED FSK RECEIVER

[75] Inventor: Edward Camp Dowling, Harrisburg, Pa.

[73] Assignee: AMP Incorporated, Harrisburg, Pa.

[22] Filed: Oct. 29, 1973

[21] Appl. No.: 410,931

[52] U.S. Cl. .................................... 178/88; 325/320

[51] Int. Cl. .......................... H04l 27/14; H04b 1/16

[58] Field of Search ....... 178/66 R, 88; 325/30, 320

[56] References Cited

UNITED STATES PATENTS 3,647,967 3/1972 Stein .................................... 178/88

*Primary Examiner*—Malcolm A. Morrison
*Assistant Examiner*—R. Stephen Dildine, Jr.
*Attorney, Agent, or Firm*—William J. Keating

[57] ABSTRACT

A received FSK signal is detected and demodulated to produce two trains of two-level pulses appearing in two separate channels, one channel of pulses representing marks, and the other channel representing spaces. Mutually exclusive gating means recognize a mark or a space as being conditionally valid only in the positive absence of the other. To further insure the reception of a valid mark or a space in the two separate channels, a digitalized integrating logic in the form of a pair of up-down counters is provided. The presence of a valid mark or space level causes the associated up-down counter to count upwards at a predetermined clock rate. When the count passes a certain value an output pulse is generated, indicating that the received mark or space is valid. For a full duration mark or space the counter will cycle completely. The absence of a mark or a space will cause the associated counter to count downwards to a certain count where it will stop until the next mark or space level occurs, when it will again count forward.

Accessing and comparing logic respond to each received bit to access successive and corresponding bits from a locally stored address and compares such accessed bits with the received bits. If complete coincidence exists through a complete received address then the receiver recognizes the received address as its own and activates logic to receive the message which follows.

13 Claims, 12 Drawing Figures

PATENTED MAY 20 1975 3,885,098

SHEET 2

| PHASE | OPERATIONS | | |
|---|---|---|---|
| Φ | REST STATE | PRE-BURST | ROM ADDRESS Φ Φ → 15 |
| 1 | MARK OR SPACE | DATA BIT COMPARE FOR MEMORY SECTION B | ↓ |
| 2 | MARK OR SPACE | ADVANCE ACCESS OF MEMORY SECTION B | ROM ADDRESS 16 → 31 |
| 3 | MARK OR SPACE | SHIFTING OF MESSAGE SHIFT REGISTER AFTER MESSAGE ENABLE PULSE | ↓ |
| 4 | MARK OR SPACE | ALLOWS COMPLETION OF ACCESS OF MEMORY SECTION B | ↓ |
| 5 | MARK OR SPACE | DATA BIT COMPARE FOR MEMORY SECTION B | ↓ |
| 6 | MARK OR SPACE | TEST FOR VALID ADDRESS ON BIT COUNT 7 —<br>— ADVANCE ACCESS OF MEMORY SECTION B<br>— ADVANCES MEMORY ACCESS BIT COUNTER<br>— RESETS SYSTEM FLIP—FLOPS | ROM ADDRESS Φ Φ → 15 |
| 7 | RESET | SWITCHES BACK TO PHASE P Φ | ↓ |

Fig. 5A

DIGITALIZED FSK RECEIVER

BACKGROUND OF THE INVENTION

This invention relates generally to means for receiving and decoding frequency shift keyed (FSK-like) signals containing marks and spaces which are represented by first and second frequencies, respectively, and more specifically the invention relates to a selectively callable FSK responsive receiver in which the mark and space representing frequencies are treated in separate channels to attain a high degree of integrity by being first demodulated, then processed through appropriate logic to establish the mutual exclusivity thereof, then digitally time integrated to determine the validity thereof on a time duration basis, and finally resynchronised and regenerated as valid marks and spaces which are supplied to separate output channels for comparison with locally stored addresses, or transfer to other devices as data.

One of the problems involved in the transmission and reception of time synchronous FSK information is the need of a synchronizing signal at the receiver for the delimiting of the received FSK signal.

One approach frequently used for providing the necessary synchronization signal at the receiver is to simply transmit a synchronizing signal to the receiver on a separate carrier frequency different from the two frequencies employed in the FSK signal. Another means for providing a synchronizing signal at the receiver is to detect the transition points between the mark and space representing frequencies employed in the FSK signal and then to utilize such transition points to drive a local oscillator.

A basic problem common to both the providing of a synchronizing signal at the receiver and also to the detection of the received FSK signal lies in the fact that a considerable amount of distortion, including amplitude distortion and phase delay, can occur in the two frequencies of a transmitted FSK signal. Since such distortion can be different for the two FSK frequencies it is possible that at the receiver both the mark and the space representing frequencies occur simultaneously, i.e., overlap. In some instances the phase delay can be so pronounced and the frequency overlap so great that it is difficult to determine whether a mark or a space has in fact been received. The use of a transmitted synchronizing signal, or one derived from the transition points, under such conditions can be seen to be subject to considerable error.

In time synchronous systems it is necessary that a decision be made as to whether a signal received during each given bit period is either a mark or a space. Since both mark and space frequencies can be present simultaneously due to distortion, it is possible, and in certain conditions even likely, that an erroneous decision will be made. Under such conditions it is preferable to reject the reception of such ambiguous data and request a retransmission thereof, usually by retransmitting a predetermined block of data which includes the ambiguous data.

To summarize, there are three problem areas in the reception of an FSK signal transmitted on a time synchronis basis. The first of these problems is a regeneration of a synchronizing type signal at the receiver needed to decode the received FSK signal, which by the time it reaches the receiver, has become somewhat asynchronous. The second problem is the determination that either a mark representing signal or a space representing signal has been received to the positive exclusion of the other signal. In other words, a mark can be received only if it is determined that a space has not been received, and as a corollary thereof, a space can be received only if it is also determined that a mark has not been received. The third problem area is the determination that the mark or space representing signal received is of sufficient duration to qualify as a valid mark or space. Due to the asychronous nature of the received bits the duration thereof cannot be measured from a synchronizing pulse. Such measurement can be made by a form of integration, however.

BRIEF STATEMENT OF THE INVENTION

It is a primary object of the invention to provide an FSK receiver in which marks and spaces, represented by first and second frequency components in the FSK signal, are received with a high degree of reliability and validity and are discarded by the receiver in the absence of such high degree of reliability and validity.

A second purpose of the invention is to provide an FSK receiver which is capable of determining with a high degree of accuracy, the presence of either a mark frequency or a space frequency to the exclusion of the other frequency, and rejecting data bits in which predetermined minimum components of both mark and space frequencies are present, thereby providing a high degree of integrity of the received data.

A third purpose of the invention is to provide an FSK receiver which is capable of establishing the reception of a valid mark or space bit by determining the duration of such mark or space bit by digitalized time integration logic.

Another primary purpose of the invention is to provide an FSK receiver in which the digitalized time integration logic means functions not only to determine the reception of a valid mark or space based on its duration but also functions to generate a synchronizing signal whose phase and frequency varies with variations in the phase and frequency of the marks and spaces of the received FSK signal.

A fifth object of the invention is to provide an FSK receiver which is capable of verifying, with a high degree of accuracy, the presence of either a mark or a space representing frequency to the mutual exclusion of the other frequency and also to establish the reception of a valid mark or space in accordance with integration of the received mark or space by digitalized time integration logic means.

A sixth object of the invention is to provide an FSK receiver which contains logic for receiving a transmitted address and comparing for recognition purposes said received address with at least two addresses stored locally in said FSK receiver with a high degree of reliability.

A seventh object of the invention is to provide an FSK receiver for separately comparing each word (byte) in each address stored locally in the receiver memory against an internally and continuously generated stop signal to determine the end of such stored addresses as said stored addresses are being compared with the address received in the FSK signal.

An eighth purpose of the invention is to provide an FSK receiver for separately comparing each address stored in the receiver memory with an internally generated stop signal as each word (byte) in the stored addresses are compared with a received address in order to identify the end of the comparison between the stored addresses and the received address, and in the event of coincidence between either of said stored addresses and the received addresses, to indicate completion by appropriate logic provided therefor that the receiver is to receive the message following the received address.

A ninth object of the invention is to provide an FSK receiver for comparing at least two locally stored addresses, one unique to the local receiver only and one common to a number of receivers with the locally stored address having a stop code word at the ends thereof, and with the receiver having logic means for generating and comparing a locally generated stop code with the stop codes of the two stored addresses to determine the completion of the comparison of the stored addresses with the received address.

A tenth object of the invention is the improvement of FSK receivers, generally.

An eleventh aim of the invention is the improvement of selective address recognition by FSK receivers, generally.

In accordance with one preferred form of the invention there is provided a means for detecting and demodulating the received FSK signal into two trains of two-level pulses which appear in two separate channels, with one of such trains of pulses resulting from the demodulation of the mark-representing frequency portions of the FSK signal and the other train of pulses resulting from the demodulation of the space-representing frequency portions of the FSK signal. Gating means are provided for determining the simultaneous presence of either a mark or a space pulse and the simultaneous absence of the other, to thereby pass only those portions of said first and second trains of pulses which occur independently of the other.

Digitalized time integrating means, which can be counters, are provided in each of the two data channels, i.e., the mark channel and the space channel, to respond to the occurrence of a pulse therein to count in a first direction starting from a nominal start count value and at a predetermined clock rate, and to count in the reverse direction back toward said nominal start count value in the absence of said pulse. Said counters are further constructed to produce an output signal when the count reaches a predetermined value while counting in said first direction, thereby establishing the condition that a received input pulse must be of a certain duration in order to be identified as a valid mark or space.

In the event of a failure of even one single received bit the entire receiver system is reset to its original condition and will await the transmission of the next occurring data pulse. If the gap or failure of such single bit occurs during the transmission of an address it is apparent that the receiver will not be able to recognize such address and the complete retransmission of the address is required in order to establish communication with the receiver being addressed.

As the stream of uniterrupted marks and spaces are received by each of the many receivers in the system, control means including comparison logic are provided in each receiver to compare such stream of pulses with the bits forming the particular address of each receiver, which particular address is stored in the receiver memory. Such control means is constructed to access each of the bits of a locally stored address, and then to supply both the received bits and the bits accessed from the address stored in memory to the comparison logic.

Means are provided to respond to the coincidence of all the bits of the received address with all of the corresponding bits of either stored address to energize gating means which will then enable the reception of the message following the end of the recognized received address. In order to determine when the end of a received address occurs there is provided a stop code at the end of said received address. A similar stop code exists at the end of the address stored in memory. Means are provided to identify the occurrence of said stop code as the addresses are being compared by the comparison logic to activate a message enabling pulse which in turn enables the reception of a message following the recognized address.

In accordance with one feature of the invention each receiver can have at least two addresses, one such address being unique to a given receiver and the other address being generic to a group of receivers and with both of said addresses being stored in the receiver memory. Said control means are provided to respond to the reception of valid bit to successively access the corresponding bits of each of the two stored addresses, during the bit period of each received bit and further to compare said two accessed bits with the corresponding bit of the received address. Since the two stored addresses are different in context and perhaps in length, the received address can coincide with only one of the stored addresses. In order to activate a message enabling pulse, it is necessary that not only coincidence of a received address with a stored address must occur but recognition of the stop code must also occur.

BRIEF DESCRIPTION OF THE FIGURES

The above-mentioned and other objects and features of the invention will be more fully understood from the following detailed description thereof when read in conjunction with the drawings in which:

FIG. 5 is a combination block and functional diagram of the entire system for receiving the FSK signal, and inciding means for demodulating and verifying said signal in separate channels for the marks and for the spaces, means for comparing the individual bits of the received signal with individual bits of an address stored in the local memory of the receiver, and means for detecting coincidence between the received and stored addresses;

FIG. 5*a* is a chart showing the various functions of the phase generating means;

DESCRIPTION OF THE OPERATION OF THE INVENTION

The following specification will be organized in the following manner:

I. CHARACTERISTICS OF THE RECEIVED FSK SIGNAL

II. GENERAL FUNCTIONAL DESCRIPTION OF THE INVENTION (FIGS. 5 AND 8)

A. RECOVERY AND COMPARISON OF RECEIVED DATA BITS WITH LOCALLY STORED ADDRESSES

B. DETERMINATION OF END OF RECEIVED AND STORED ADDRESSES-THE STOP CODE

C. PHASE FUNCTION GENERATING MEANS FOR CONTROLLING PROCESSING OF RECEIVED BITS

Figure 6:
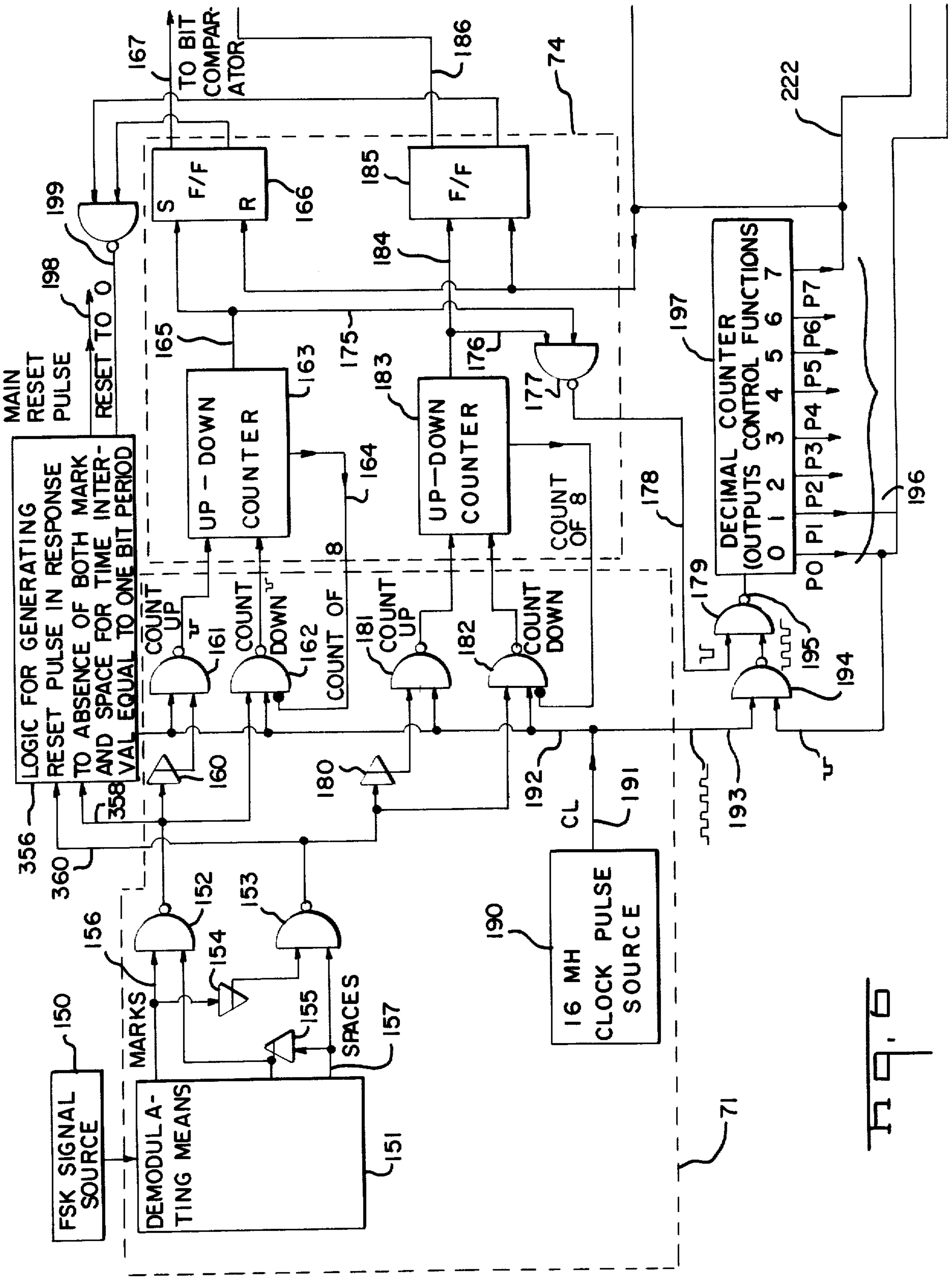
FIGS. 6, 6*a* and 6*b*, taken together, show detailed logic diagram of the invention.
Figure 6A:
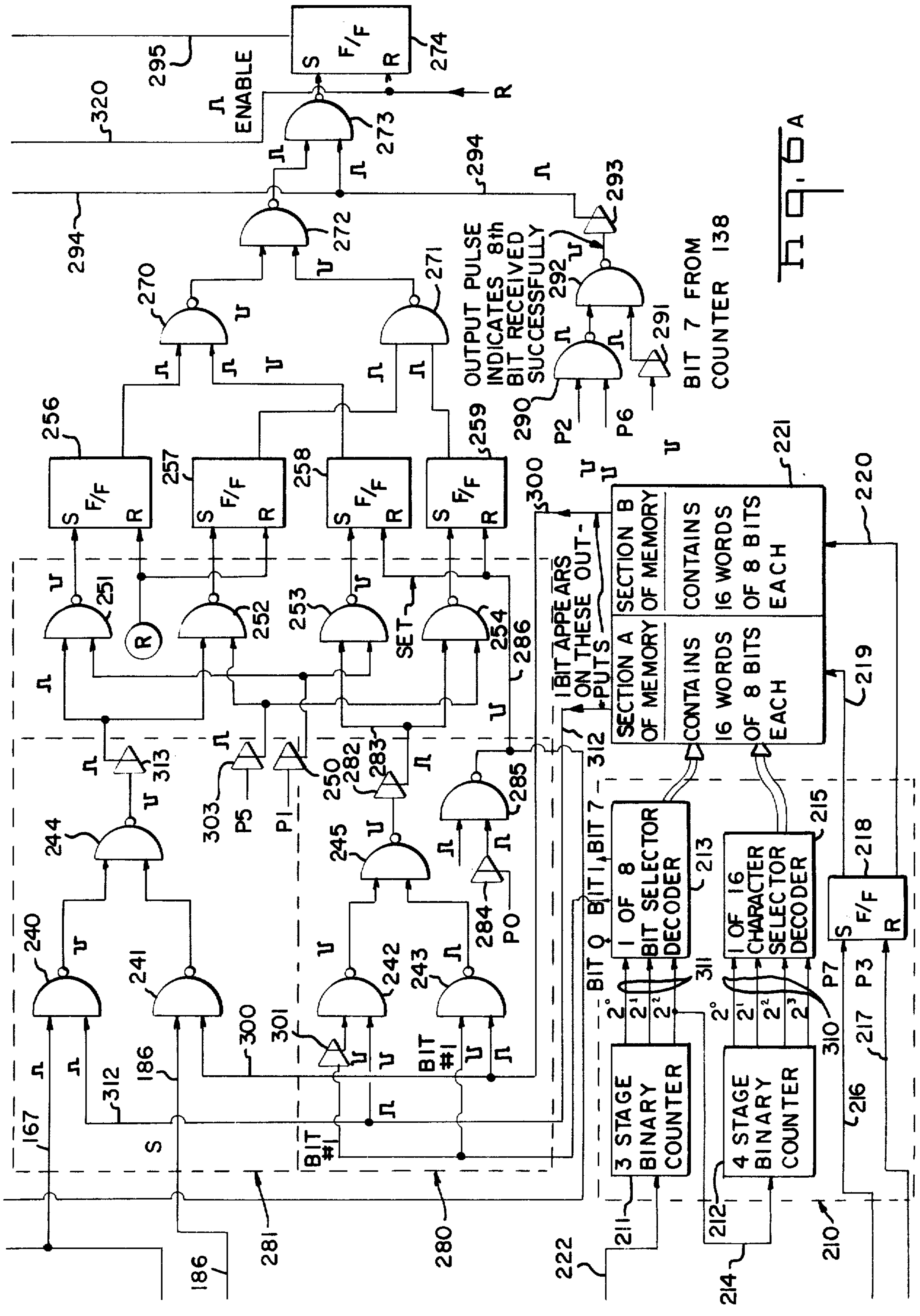
Figures 6B, 6C:
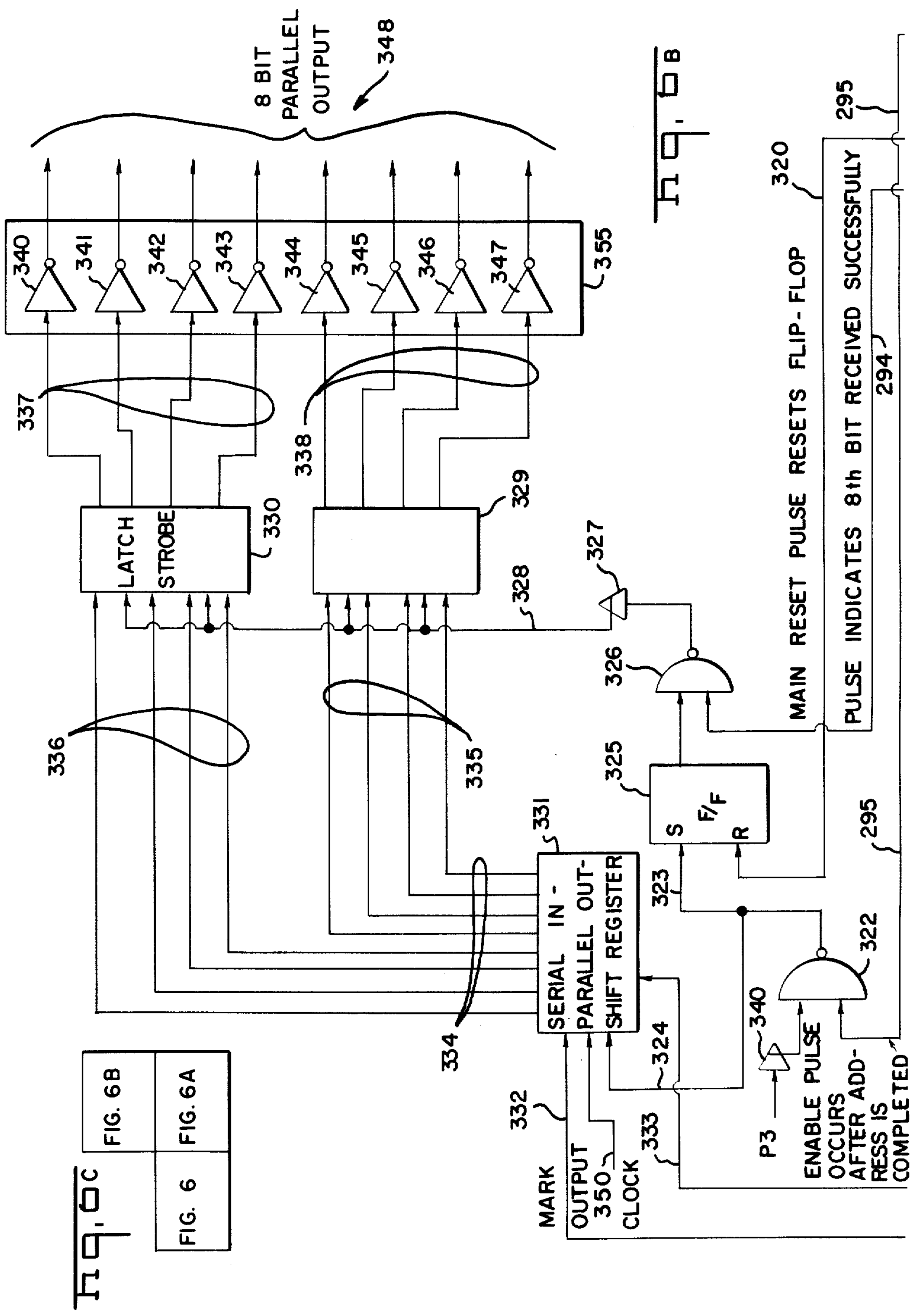
FIG. 6*c* illustrates how FIGS. 6, 6*a* and 6*b* fit together.

III. DETAILED DESCRIPTION OF THE INVENTION (FIGS. 6, 6*a* AND 6*b*)

A. RECOVERY OF MUTUALLY EXCLUSIVELY MARKS AND SPACES FROM RECEIVED FSK SIGNAL

B. DIGITALIZED TIME INTEGRATION OF MUTUALLY EXCLUSIVE MARKS AND SPACES-(UP-DOWN COUNTERS)

C. THE RECEIVER MEMORY AND ACCESSING LOGIC THEREFOR

D. THE BIT COMPARISON LOGIC

E. GENERATION AND COMPARISON OF THE STOP CODE

F. RESULT OF COINCIDENCE OF A RECEIVED ADDRESS WITH A STORED ADDRESS

G. THE LOGIC FOR RECEIVING MESSAGE AFTER RECOGNITION OF VALID ADDRESS

H. THE MAIN RESET LOGIC (FIGS. 6 AND 8)

I. THE PHASE FUNCTION GENERATOR

J. THE FUNCTION AND OPERATION OF THE UP-DOWN COUNTERS (FIGS. 6 AND 8)

I. CHARACTERISTICS OF THE RECEIVED FSK SIGNAL

Figure 1:
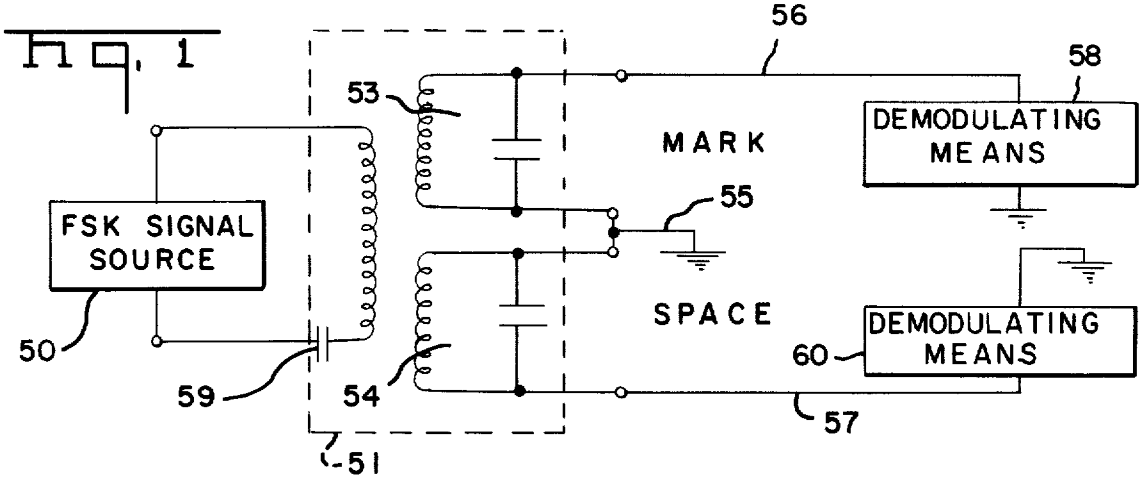
FIG. 1 shows the basic filtering means for receiving the FSK signal and for separating said received FSK signal into mark and space representing frequencies which are then supplied to the receiver on separate channels and are separately demodulated.
Figure 2:
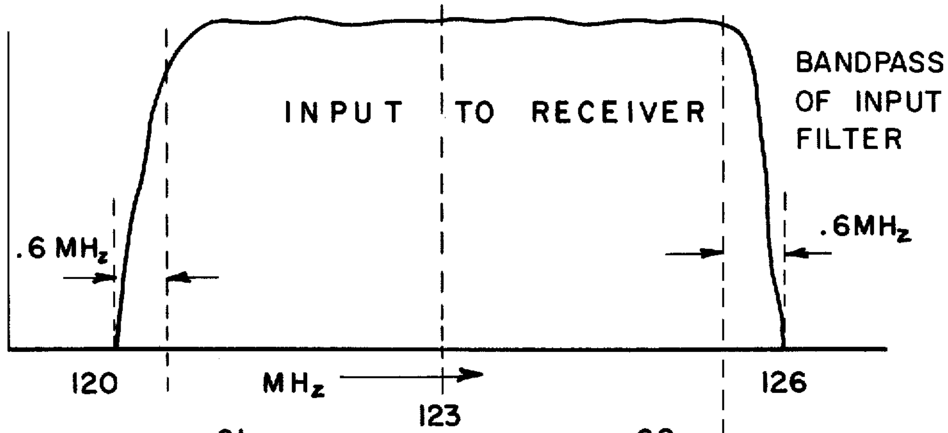
FIG. 2 is a frequency vs. amplitude curve of the FSK signal supplied to the receiver and includes both the mark representing frequency and the space representing frequency.

Referring now to FIG. 1 an FSK signal is supplied from an FSK generating source 50 to a filter network 51 at the receiver by some means, such as for example, a coaxial cable, not shown in FIG. 1. The filter network 51 has an input circuit comprised of an inductance 52 and a capacitor 59 arranged in series. A pair of output circuits 53 and 54 are each comprised of a parallel arrangement of an inductor and a capacitor. The frequency response characteristic of filter network 51 to the received FSK signal from source 50 is as shown in FIG. 2, and can be seen to cover a band width of approximately 6 megahertz, which is the band width conventionally allocated to a single television channel. In the particular example shown in FIGS. 1 and 2, the 6 megahertz band width is shown to lie between 120 and 126 megahertz which is, in fact, an unused channel lying between channels 6 and 7 of the current 13 channel television frequency allocation.

Figure 3:
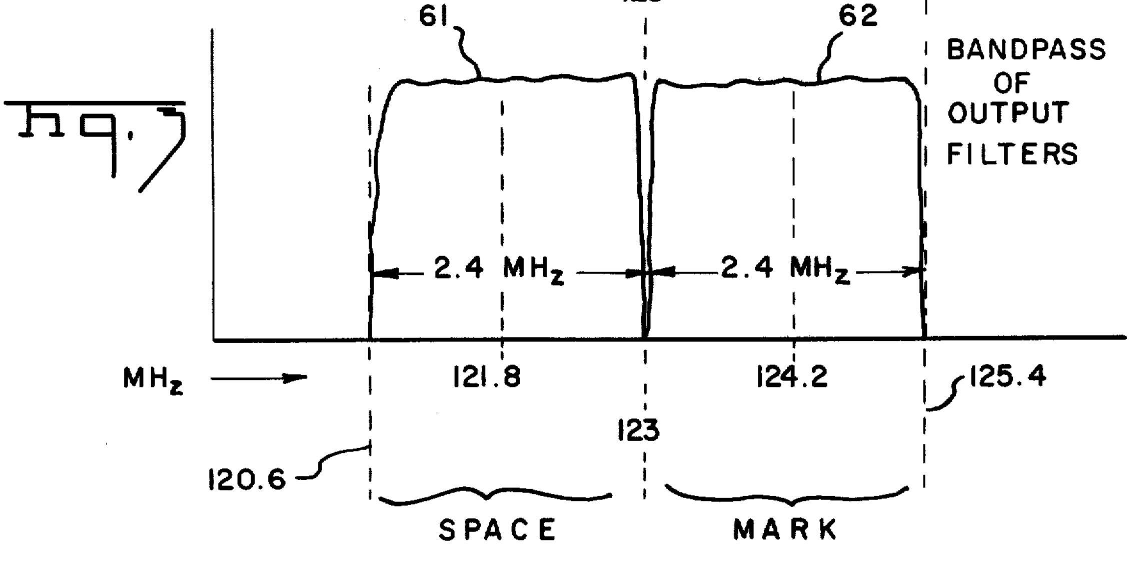
FIG. 3 is a frequency response curve showing the output of the discriminator of FIG. 1 wherein the space and mark representing frequencies have been separated into separate channels.

The two tuned circuits 53 and 54 are designed to have a frequency response characteristic of approximately 2.4 megahertz as shown in FIG. 3. More specifically the tuned circuit 53, which is designed to receive mark-representing frequencies contained in the FSK signal, is shown as having a band width of 2.4 megahertz extending from 123.0 to 125.4 megahertz. The tuned circuit 54 will pass a frequency band width of 2.4 megahertz.

Figure 4:
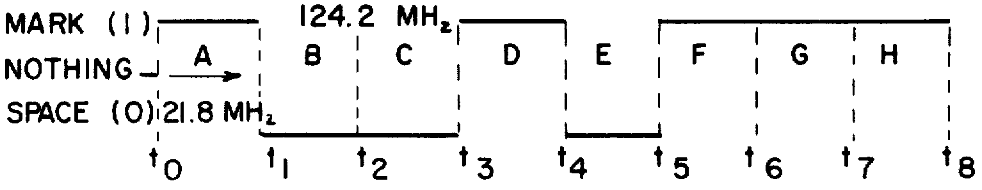
FIG. 4 is a two level frequency diagram showing a typical reception of marks and spaces over a given time interval.
Figure 7:
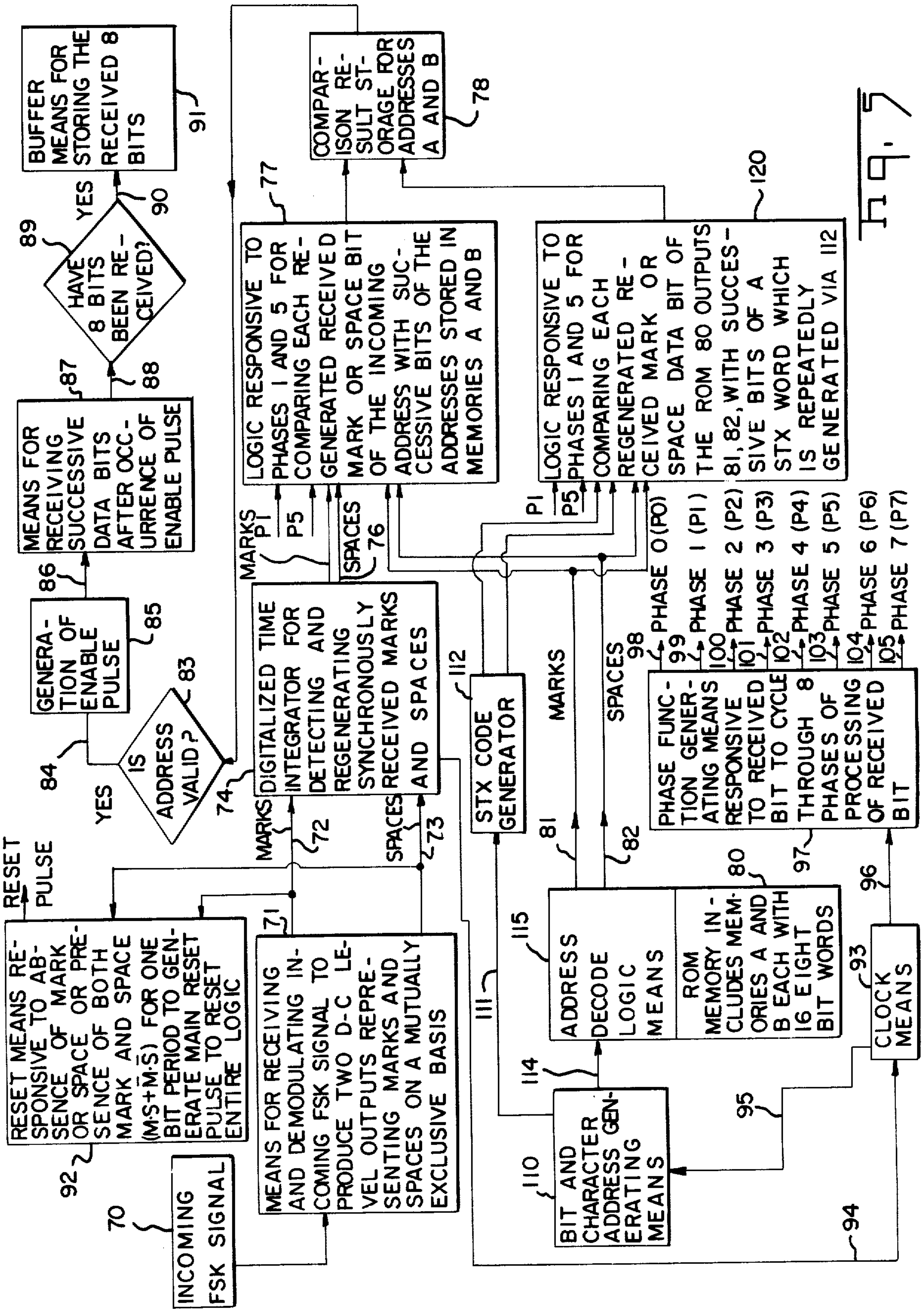

In the received FSK signal the mark frequency has a nominal value of 124.2 megahertz and the space frequency has a nominal value of 121.8 megahertz, as indicated in FIGS. 3 and 4. It can be seen in FIG. 3 that these two frequencies lie substantially in the center of the pass bands 61 and 62. Thus, the transmission of a mark frequency at 124.2 megahertz will produce outputs from the tuned circuit 53 to a demodulating means 58 via conductor 56. Similarly, a space representing frequency of 121.8 megahertz in the FSK signal will be passed by tuned circuit 54 to demodulating means 58 and 60 via leads 56 and 57.

The data bits in the FSK signal are transmitted in time synchronous manner from the transmitter, as shown in FIG. 4, with the transition time between bits being designated by times $t_0$ through $t_8$ and the bit periods being designated by the letters A, B, C, D, E, F, G and H. In FIG. 4 marks are shown as being transmitted during bit periods A, D, F, G and H, and spaces are shown as being transmitted during bit periods B, C and E.

As discussed above, however, due to phase delay and attenuation which occur in the transmission media, the mark and space indicating frequencies in the FSK signal are no longer time synchronous when they reach the receiver and in fact in many cases are no longer mutually exclusive. Accordingly, before the bits contained in the received FSK signal can be compared with the address stored in the memory of the local receiver it is necessary to carefully examine and test the bits of the received FSK signal to determine whether they are in fact valid bits and further, whether they are in fact marks or spaces.

Figure 8:
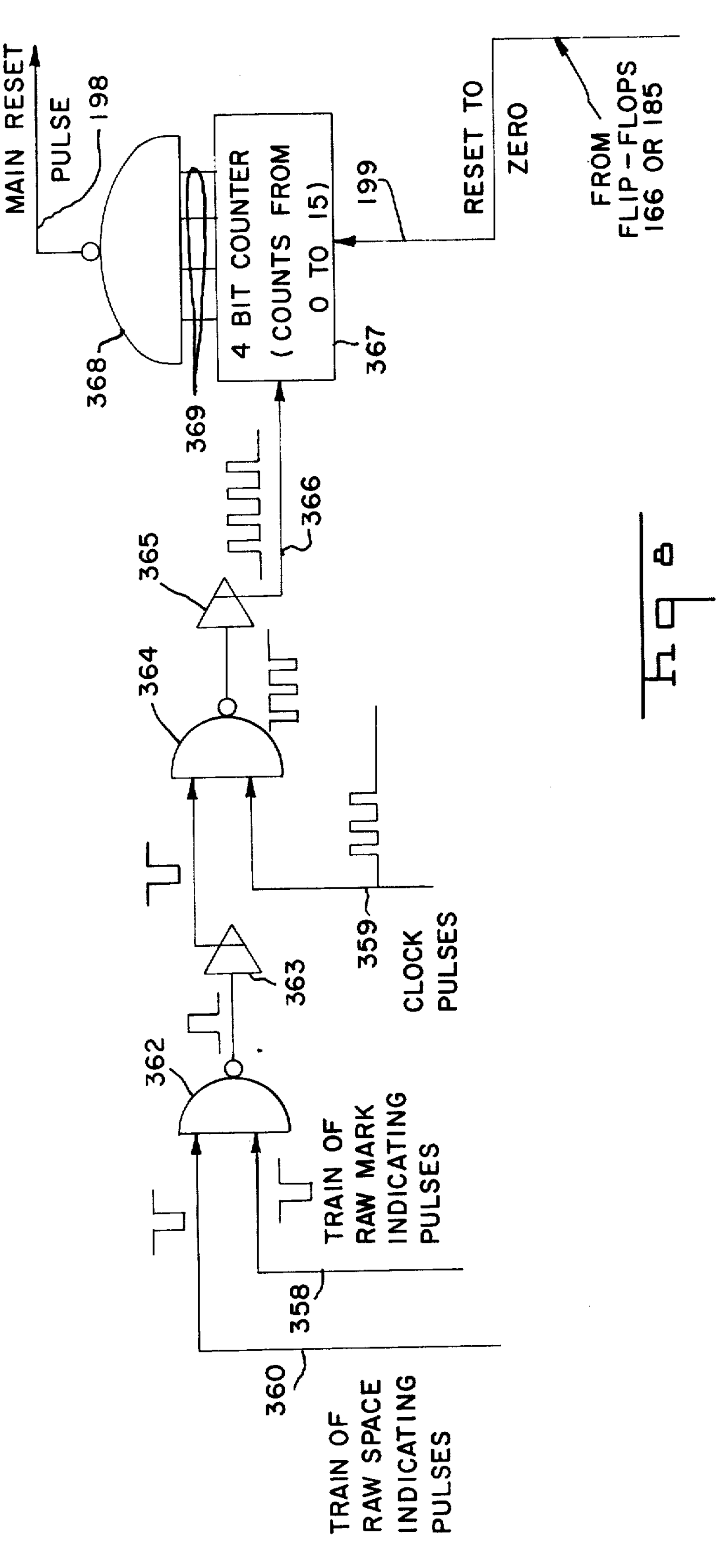
FIG. 8 shows detailed logic generating the stop code.

II. GENERAL FUNCTIONAL DESCRIPTION OF THE INVENTION (FIGS. 5 and 8)

A. RECOVERY AND COMPARISON OR RECEIVED DATA BITS WITH LOCALLY STORED ADDRESSES

Referring now to FIG. 5 there is shown a functional logic diagram of the invention. The primary purpose of FIG. 5 is to introduce the reader to the system generally without too much emphasis on those portions thereof in which the invention lies primarily. With the background of the description of FIG. 5 the invention will be more readily understood from the description of the more detailed logic shown in FIGS. 6, 6*a* and 6*b*.

In FIG. 5 the FSK signal is supplied from source 70 to a demodulating means 71, which functions to demodulate the two frequencies contained in the FSK signal and to supply the marks and spaces represented by said frequencies to two separate output channels 72 and 73.

As will be discussed in more detail later, the demodulating means 71 includes logic whereby the reception of a mark can occur only when there is the simultaneous absence of a space. Similarly the reception of a space can occur only when there is the simultaneous absence of a mark.

The two output pulse trains representing marks and spaces and appearing on output leads 72 and 73 are supplied to a pair of digitalized time integrating means designated generally by the block 74 which, in effect, digitally measures the time duration of each mark and space pulse and if such time measurement indicates that a valid bit has been received, initiates an internal clock count which controls the processing (comparison) of said received bit and which also functions as a form of internally generated synchronizing signal.

The digitalized time integrator means 74 regenerates two new trains of two-level d-c pulses representing marks and spaces respectively and synchronized with the afore-mentioned locally generated synchronizing signal. Such trains of pulse representing marks and spaces are provided to bit comparison logic means 77. Also supplied to said bit comparison logic means 77 is an address stored in a local read only memory (ROM) 80.

The accessing of the local address stored in memory 80 is accomplished by means of addressing means 110 and 115 under control of the control logic 97 which also functions to generate said synchronizing signal, as well as timing signals which function to access said ROM at the proper time during each bit period to supply the proper bit of the locally stored address to the bit comparison logic.

It is to be noted that the logic of the receiver system is designed in such a manner that if no bit is received for one bit period, that is if no FSK signal is received for one bit period, the main reset logic 92 functions to reset the entire receiver system including the means for addressing the address stored in memory 80. Then upon the occurrance of the first next succeeding received bit in the FSK signal the receiver system becomes operative again and the first bit of the address stored in the memory 80 is accessed by addressing means 110 and 115 and is supplied to the bit comparison logic 77 where it is compared with said first next succeeding bit received after the resetting of the receiver by the main reset logic 92, as discussed above.

Thereafter, as each successive bit in the FSK signal is received by the receiver, that is, is demodulated from the received FSK signal and determined to be a valid bit, such received bit is compared with the next succeeding bit which is accessed from memory 80 by addressing means 78 and supplied to comparison logic 77.

Such comparison of these successively received bits with successively accessed bits from memory 80 in comparison logic 77 continues until all bits of the stored address have been compared with all bits of the received address. If coincidence occurs between all of the compared bits then the received address is in fact coincident with the address stored in the memory 80 and the receiver of FIG. 5 is in fact the one being addressed.

If such coincidence of all bits does not exist, then certain logic in the receiver (to be discussed in connection with FIGS. 6, 6a and 6b will determine and store such fact of non-coincidence and the receiver of FIG. 5 will not be activated to receive the message following the address. Presumably some other receiver in the system has been addressed and will receive the message following the transmitted address.

II. B. DETERMINATION OF END OF RECEIVED AND STORED ADDRESSES-THE STOP CODE

Assume, however, that the receiver of FIG. 5 was in fact the receiver addressed. The end of the address is identified by a stop code which is present as the last word both in the received address and in the address stored in memory 80. The bits making up the stop code of the received address must coincide with the bits of the stop code contained in the address locally stored in memory 80. Upon the determination of coincidence of the stop code the transmitted address will have been completely received and further will have been recognized as the address of the receiver of FIG. 5, with the exception however, that some means must be provided to determine that the stop code has been compared. Such means is provided in the following manner. A logic means within the receiver functions to repeatedly generate the stop code, which is an eight bit word in the preferred form of the invention, with each eight bit word of the received address. Then, at the same time the stop code of the address stored in the ROM memory is supplied to comparison logic 77 for comparison with the stop code of the received address, the ROM stored stop code is also supplied to a second comparison logic 120 where it is compared with the locally generated stop code.

As mentioned above, the locally generated stop code is an eight bit word (byte) which is regenerated every eight bits during the process of receiving and comparing the received address and is byte synchronized so that it will occur in synchronism with the stop code of the stored address as said stop code is accessed from ROM memory 80 bit-by-bit and supplied into comparison logic 120. Then when the stop code contained in the address stored in memory 80 is also supplied to comparison logic 120 coincidence with the locally generated stop code occurs and a signal is generated indicating that the end of the recognized address has occurred.

The concurrent coincidence of the stored address with the received address and the locally generated stop code with the stop code of the stored address will result in the generation of a message enabling pulse. In FIG. 5 the logic block 78 stores the results of the comparison operations. At the end of the processing of each received bit the contents of block 78 are examined, by decision logic 83. When the concurrent coincidence occur the decision block 83 causes logic block 85 to generate the message enable pulse. Such message enable pulse energizes circuit 87 which is a gating means responsive to said message enable signal to enable the receiver to receive the message data immediately following the address. Such message data is then supplied via lead 88 through a counting means 89 and into a buffer storage means 91 via lead 90 where it is stored until utilized.

The received message can be utilized for any number of purposes such as commands initiating the reading of a water meter, an electric meter or tuning a television set to a certain channel, or any one of many other functions.

Returning now to desision block 89 of FIG. 5 the received message is examined as it is received. Due to the particular design of the preferred embodiment of the invention disclosed herein, the received message is predetermined and must be comprised of at least eight successively received bits in order to consistute a valid received message. If such eight bits are not received before the occurrence of a single bit period with no reception, the desision block 89 will so recognize and will not pass the bits actually received, which are less than eight, from the receiving means 87 into the buffer storage 91.

The reason for the inclusion of decision block 89 in the logic is to protect the system against receiving a message in which one or more bits has been omitted for one reason or another so that less than the required eight bits are received.

II. C. PHASE FUNCTION GENERATING MEANS FOR CONTROLLING PROCESSING OF RECEIVED BITS

In FIG. 5 there is shown a phase function generating means 97 which is responsive to the reception of each valid bit in the FSK signal to generate a series of outputs on the eight ouput leads 98 through 105. These phases are provided in order to initiate and perform certain functions on the received bits in order to determine whether such received bits do, in fact, coincide with the corresponding bits of the stored address. As discussed above, such processing of the received bits includes for example, the addressing and accessing of successive bits in the stored address and the comparing of such accessed bits with successive bits of the received bits in the comparison logic 77 and 120 to determine if coincidence exists.

In fact, however, only four of the eight phases is required to process each received bit with the corresponding bit in the stored address. But in the preferred embodiment of the invention described herein, there are two stored addresses with which the received address must be compared. Consequently four of the eight phases (0–3) employed in comparing the received bit with the corresponding bit of one stored address, and the remaining four phases (4–7) being employed in comparing the said received bit with the corresponding bit of the stored second address.

To simplify the description the case where only one address is being compared with the received bit will be considered first. In such case, the phase function generator 97 is energized upon the receipt of a valid bit and phase 0 is initiated. The initiation of phase 0 is implemented by a pulse appearing on output lead 98 of phase function generating means 97. Such output signal on lead 98 directs the bit and character address generating means 110 to that portion of the memory 80 which contains said first address. Next, a pulse is generated on output lead 99 of phase function generating means 97 which, in accordance with the chart of FIG. 5*a*, functions to initiate a comparison of the received bit with the corresponding bit in the one stored address being compared. In FIG. 5 output lead 99 is shown as being connected to comparator circuit 77.

Next a pulse appears on output lead 100 which initiates phase 2. An output on lead 100 initiates the decision logic 83 which determines if coincidence of the received and stored addresses has occurred and also coincidence of the locally generated stop code and the stop code at the end of the stored address.

The next phase is phase 3, which is evidence by a pulse P3 on output lead 101 of phase function generator 97. Energization of phase 3 initiates a shifting of the accessing of the half of the receiver memory containing the first address to the other half of the receiver memory which contains the second address. Such change of access from the first to the second half of the receiver memory requires a certain minimum time interval so that it is not until phase 4 occurs that the specific bit in the second address is in fact properly addressed and ready to be accessed and supplied to the comparison circuit in the following phase 5. In other words, phases 3 and 4 together form a time interval of sufficient duration to allow the accessing of the bit in the second address to occur.

The function of the second address has been alluded to briefly hereinbefore. Assume that the first address was unique to the receiver of FIG. 5. The second address can be generic to a number of receivers, including the receiver of FIG. 5, as for example, when it is desired to communicate simultaneously with a class of receivers.

Thus it is apparent that during the time interval when a given bit is being received in the incoming FSK signal it is necessary to compare therewith the corresponding bits of both the unique and the generic address. Accordingly, all of the phases 0 through 7 must occur well within the bit period of the received bit, typically within a ½ bit time interval.

In the present invention the bit rate has been assumed to be a nominal 1 megahertz. The phase rate can be 16 megahertz so that the eight phases initiated by energization of the phase function generating means 97 of FIG. 5 require only one half microsecond, well within the one microsecond bit period of the received FSK signal.

Returning again now to a continuation of the discussion of the functions of the phases with respect to the second (generic) address, the initiation of phase 4 of function generator 97 of FIG. 5 functions to access the corresponding bit of the second address and to supply said bit to the comparison logic 77 and 120. Then, when the phase 5 is initiated by a pulse appearing on output lead 103 of function generator 97, the comparison of the received bit with the corresponding bit of the generic address is effected in comparing logic 77. The results of said comparison are then stored in the comparison result storage means 78, along with the ROM-stop code (STX) generator comparator 120.

Phase 6 is next initiated by means of a pulse appearing on output lead 104 of function generator 97. Initiation of phase 6 functions to determine whether a valid generic address has been completed in the same manner as phase 2 determined whether a valid unique address had been completed.

Phase 6 also functions to shift the memory accessing logic 110 from the second half of the memory back to the first half of the memory 80, which contains the first address. Other functions performed during phase 6 is a resetting of the various flip-flops contained in the logic of FIG. 5, which flip-flops had stored the fact that the previously received bit had been a mark or a space. Also the means for accessing the next bit in the addresses stored in the receiver memory are incremented by a count of one so that the next adjacent bit in said two addresses will be accessed upon receipt of the next bit in the FSK signal.

At the end of the reception of the generic address, the logic will operate to determine two things: firstly, to determine if all of the bits of the received address coincide with all of the bits of the stored generic address, and secondly if the locally generated stop code coincide with the stop code at the end of the stored generic address. If both of the foregoing determinations are positive, then the received address is valid and is so decided by the logic of block 83 in FIG. 5. As a result of such decision a signal is supplied from logic block 83 to enable pulse generating means logic 85, which responds thereto to generate an enable pulse which opens gating means for the reception of the message immediately following the received address. Such gating means for receiving such messages is contained in logic block 87.

Counting means are provided within logic block 89 to count the number of bits received in the message in this preferred embodiment of the invention. Upon the reception of eight such message bits, the decision logic 89 responds thereto to supply a signal to transfer the received eight received message bits to buffer storage means 91.

III. DETAILED DESCRIPTION OF THE INVENTION (FIGS. 6, 6*a* AND 6*b*) A. RECOVERY OF MUTUALLY EXCLUSIVE MARKS AND SPACES FROM RECEIVED FSK SIGNAL

Referring now to FIGS. 6, **6*a* and 6*b* there is shown a detailed logic diagram of the invention. The FSK signal is derived from a source 150 and demodulated in demodulating means 151 to produce two trains of two level d-c pulses on output leads 156 and 157. In the train of pulses on output lead 156 the upper level represents the presence of marks and and the lower level represents the absence of marks. Similarly, in the train of pulses on output lead 157** the upper level represents spaces and the lower level represents the absence of spaces.

In order to insure the validity of the reception of a mark or a space, logic is provided to insure that a mark is received only when an upper (high) level d-c signal is present on output lead 156 and a lower level d-c signal is simultaneously received on output lead 157. Similarly, the logic also insures that a space can be received only when an upper (high) level d-c signal is received on output lead 157 and a low level d-c signal is simultaneously received on output lead 156.

More specifically the NAND gate 152 has two inputs thereto, one of which is the output lead 156 which contains the train of pulses representing marks, and the other input lead is connected to the output lead 157 through an inverter 155. To produce mark-indicating low level signal on the output of NAND gate 152 it is necessary that high level signals to supplied to both inputs of NAND gate 12. Thus it is necessary that a low level signal be present on space output lead 157, which is inverted to a high level signal by inverter 155, and that a high level signal be simultaneously received on mark output 156 in order to produce a low level output from NAND gate 152.

Similarly, to produce a space-indicating low level output from NAND gate 153 it is necessary that an upper level signal be received on output lead 157 and a low level signal be received on the mark output 156. The inverter 154 will invert such low level signal to produce a high level signal on one of the inputs of NAND gate 153.

It is to be noted specifically that the presence of a low level output signal at the output of either NAND gate 152 or NAND gate 153 represents the presence of a mark or a space, respectively. In the absence of the reception of both a mark or a space there will be low level signals on both the output leads 156 and 157 so that the outputs of both NAND gates 152 and 153 will be at a high level.

If high level output signals are received simultaneously on both the mark output lead 156 and the space output lead 157 neither NAND gate 152 or NAND gate 153 can have a high level output signal since the inverter 154 and 155 will thereby function to produce low level signals on one output of each of the NAND gates 157 and 153. It is to be noted that high level signals on both the output lead 156 and 157 can occur simultaneously in the event of a phase delay of one of the two frequencies $f_1$ and $f_2$ making up the FSK signal, so that an overlap of the two frequencies at the receiver occurs. During such frequency overlap the demodulation of the FSK signal will produce high level signals on both output leads 156 and 157.

It is to be noted also that it is impossible for both NAND gates 152 and 153 to have low level signals thereon simultaneously, which would indicate the simultaneous detection of both a mark and a a space at the same time. More specifically, the presence of a low level signal on the outputs of both NAND gates 152 and 153 simultaneously, imples that both input leads to both NAND gates 152 and 153 are at high levels. This cannot occur inasmuch as a high level input on either output lead 156 or 157, indicating a mark or a space will, by virtue of the inverters 154 and 155 as mentioned above, produce a low level signal to the other input of the opposite NAND gate of NAND gates 152 and 153.

Thus, when both mark and space representing frequencies are received at the receiver simultaneously both NAND gates 152 and 153 will remain at high levels, indicating the reception of neither a valid mark or a valid space.

Figure 9:
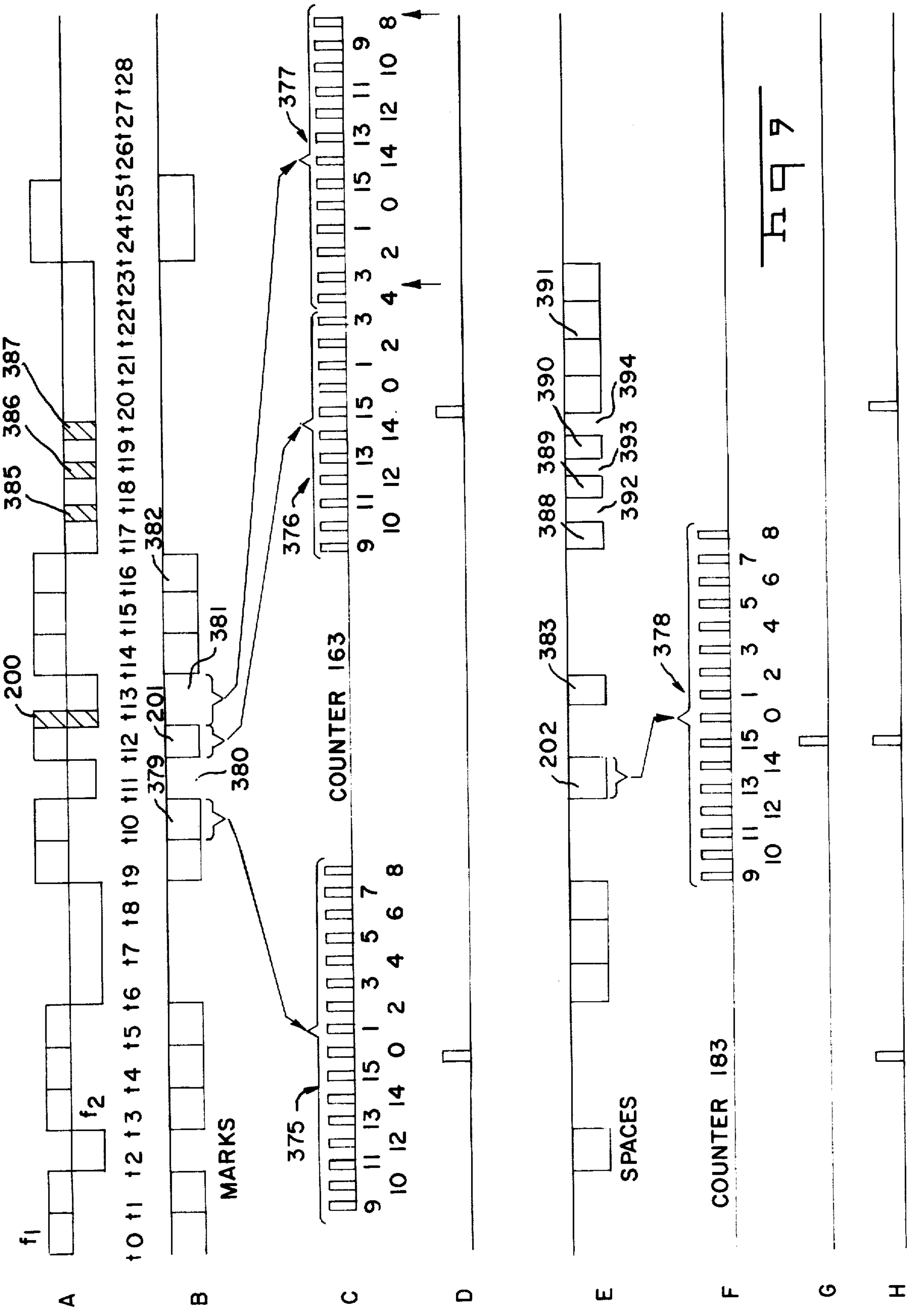
FIG. 9 is a set of waveforms illustrating how each received data bit triggers a counter means which functions as a digitalized time integration means to verify the reception of a valid mark or space.

Reference is made to the waveforms of FIG. 9 for a fuller understanding of the foregoing. In the waveform of FIG. 9 the received FSK signal is represented by the two level signal A, with the upper level representing marks received at frequency $f_1$, with the lower level representing spaces received at frequency $f_2$. The time indication $t_0$ through $t_{28}$ represent the nominal time sychronous division of the data bits.

The waveform B shows the two level d-c signal at the output of NAND gate 152 of FIG. 6 with the upper level representing the presence of a valid mark. Similarly the waveform E shows two level d-c signal representing the output of NAND gate 153, with the upper level representing the reception of a valid space.

In waveform A, at about time $t_{13}$ there is shown a shaded area 200 which represents the simulteneous reception of both mark and space frequencies $f_1$ and $f_2$. Because of the logic discussed above, and including NAND gates 152, 153 and inverters 154 and 155, the shaded portion 200 of the received FSK signal will result in neither a space or a mark signal being produced at the output of NAND gate 152 or 153. More specifically, in waveform B, the mark-indicating pulse 201 can be seen to be slightly short of the nominal bit period $t_{12}$–$t_{13}$ since no mark signal can be generated during the shaded portion 200. Similarly in waveform E wherein pulse 383 represents the reception of a space frequency $f_2$ it can be seen that said pulse 383 has a duration less than the nominal bit period of the received pulse. More specifically, pulse 383 does not begin until the shaded portion 200 of waveform A terminates.

The significance of shortened mark and space representing pulses, such as pulse 201 and 383 will become more apparent later herein in connection with the digitalized time integration of said pulses. At that time it will be seen that unless said pulses are of sufficient duration they will not qualify as valid mark or space indicating pulses. The waveforms C and F of FIG. 9 will also be discussed later herein in connection with such time integration functions.

Returning again to the logic of FIG. 6, the mark-representing pulses and space-representing pulses of NAND gates 152 and 153 are each supplied respectively to two logic means, the first logic means being reset logic 356 which functions generally to respond to the absence of either a mark or a space for one complete nominal bit period to reset the entire receiver. This reset logic will be discussed in more detail later herein. The second logic means is the digitalized time integration logic for determining minimum duration of an acceptable or defined legitimate mark or a space. This second logic is discussed in detail in detail in the following section.

III. B. DIGITALIZED TIME INTEGRATION OF MUTUALLY EXCLUSIVE MARKS AND SPACES

The outputs of gates 152 and 153 are also utilized to activate the up-down counters 163 and 183 respectively. More specifically, for example, the output of NAND gate 152 is supplied in inverted form through inverter 160 to NAND gate 161 and also in non-inverted form to NAND gate 162, the outputs of NAND gates 161 and 163 being supplied respectively to the count-up and count-down inputs of counter 163.

In the presence of a valid mark bit the low level output of NAND gate 152 will be inverted by inverter 160 and will function to gate clock pulses from clock source 190 through NAND gate 161 and into the count-up input of counter 163. The said 16 megahertz clock pulses are generated in clock pulse source 190 and are supplied to the second input of NAND gate 161 through leads 191 and 192. Such clock pulses are gated through NAND gate 161 during the time duration of a received mark pulse and will cause the up-down counter 163 to count in an upward direction. On the other hand, the low level output of NAND gate 152 is supplied directly to NAND gate 162 and functions to disable NAND gate 162 during the presence of a received mark so that counter 163 cannot count downward at such times. However, in the absence of a mark, that is with a high level signal at the output of NAND gate 152 NAND gate 161 will be disabled and NAND gate 162 will be enabled, thus permitting the clock pulses from source 190 to be gated through NAND gate 162 only and cause the counter 163 to coundt downward, provided that the third input to NAND gate 162, from counter 163, is high.

The basic operation and function of the up-down counter 163 is as follows. In the described embodiment of the invention counter 163 has a capacity of 16 counts ranging from 0 through 15 and is constructed so that when it reaches the count of 15 the next count will return it to 0 and it will again count up to 15. Conversely, it will count downward through 1 and to 0 and then to 15. The 16 megahertz clock pulse source 190 is 16 times the nominal bit rate of the received 1 megahertz bit rate.

In normal operation the up-down counter will be sitting at a count of 8 at the beginning of the reception of a mark. During the presence of the mark pulse, the counter will count upwardly from 8 through 15, then to 0 and then back up towards the count of 8. If the received mark pulse is equal to one microsecond, the up-down counter will count through a complete cycle, that is it will count from the count of 8 through the count of 15, then back to 0 and then back up to 8.

As the counter passes from 15 to 0 an output pulse is generated on output lead 165 therefrom which sets a flip-flop 166 indicating the reception of a valid mark bit.

If the next received bit is also a mark the counter 163 will continue to count upwardly, i.e. in a forward direction, and will again make the transition from 15 to 0 thereby again placing the flip-flop 166 in its set condition. It is to be noted that the flip-flop 166 and also the flip-flop 185 are reset (if in a set condition) at the end of each received bit by the phase 7 pulse generated on output $P_7$ of function generator 197.

Since it is necessary that the counter 163 make the transition from 15 to 0 in order to register the presence of a mark, and further since consecutively received marks might each have a duration less than one microsecond, thereby each producing less than a full cycle of counts in counter 163, it is apparent that a consecutive string of mark signals each having less than a full bit period duration will eventually result in the failure of counter 163 to pass the 15 to 0 transition. More specifically, by pre-determined definition of the system coding, no more than seven marks can be received consecutively. Therefore, seven consecutively received marks cannot lose more than seven counts in the counter before casusing the seventh received mark to fail to drive the counter past the 15 to 0 transition.

To minimize the possibility of such an error occuring, the absence of a mark functions to cause counter 163 to count in the reverse direction and to stop such reverse counting when the couner reaches the count of 8. Thus, the occassional occurrence of a space will cause counter 163 to count in the reverse direction back to the count of 8 thereby in essence resetting said counter 163 to the proper value for the reception of the next mark bit. It is to be noted that the reverse counting of counter 163 causes no output signal therefrom, even when counting from 0 to 15.

The mechanism for causing cessation of reverse counting when said count reaches the count of 8 is as follows. A feedback lead 164 supplies the count of 8 of counter 163 back to the input of NAND gate 162. Thus, at the count of 8 a low level signal is supplied back to the input of NAND gate 162 thereby preventing any additional clock pulses from source 190 from being supplied to the count-down of counter 163.

In a similar manner the space-indicating output from NAND gate 153 is supplied to up-down counter 183 through a first circuit path consisting of inverter 180 and NAND gate 181 and through a second path consisting of NAND gate 182 to gaye the clock pulses from clock pulse source 190 through one of said NAND gates 181 or 182 to cause counter 183 to count in a forward or in a reverse direction depending on the presence or the absence of a space. As in the case of the up-down counter 163 in response to mark input pulses, the up-down counter 183 will function to set flip-flop 185 each time it counts in a forward direction through the count 15 to the count of 0.

Also, similarly to the operation of counter 163, the counter 183 will set flip-flop 185 to indicate the reception of a space when the count passes from 15 to 0. At a slightly later time in the bit period the output $P_7$ of phase generator 197 will reset flip-flop 185. However, during the time flip-flop 185 is set, the presence of a space will be indicated thereby and will be supplied to a bit comparitor shown in FIG. 6*a*, which bit comparitor will be described in later paragraphs herein.

Next to be described herein is the receiver memory and the means for accessing successive bits of the addresses stored therein. Such successive bits of the locally stored addresses will then be compared with bits of the received address to determine if coincidence therebetween exists.

III C. THE RECEIVER MEMORY AND ACCESSING LOGIC THEREFORE

To access sections A and B of memory 221 in FIG. 6*a* there is provided a three stage binary counter 211, a four stage binary counter 212, a bit decoder 213, and a character selector decoder 215. Also provided is a flip-flop 218 which functions, under control of phase pulses $P_2$ and $P_6$ to switch the accessing logic, which includes the counters and decoder mentioned immediately above, between sections A and B of memory 221.

In the operation of the accessing logic the three stage binary counter 211 is advanced by one count in response to each occurrence of a $P_7$ phase function pulse, which is generated in phase generator 197 in FIG. 6, and which is supplied to said binary counter 211 via lead 222.

Each eight count of binary counter 211 is supplied to the input of four stage binary counter 212 via lead 214. Thus each eight received data bits, which constitute a word, or character, will advance the four stage binary counter 212 one count.

The four stages of binary counter 212 are supplied to character selector decoder 215 via leads 310. The decoder 215 functions to select one of 16 eight bit words in either section A or section B of memory 221. The particular section of memory from which the word selection is made is determined by the state of flip-flop 218. Assume for purposes of discussion that flip-flop 218 is in a set condition so that section A of memory 221 is accessed.

The status of each stage of three stage binary counter 211 is supplied to bit selector decoder 213 via leads 311. In response to the count of counter 211 the bit selector decoder 213 functions to select one of the eight bits of the eight bit word selected by the character decoder 215. This single, selected bit is then supplied from section A of memory 221 via lead 312 directly to NAND gate 240 and also to NAND gate 242 through inverter 301.

As discussed hereinbefore, during the reception of each bit in the received FSK signal the flip-flop 218 will assume both its set position and its reset position during different portions of said bit period and, more specifically, in response to the $P_2$ and $P_6$ phase pulses. In this manner the flip-flop 218 will first energize section A of the memory 221 and then subsequently will energize section B of memory 221, so that both of the corresponding bits of the two stored addresses in sections A and B in memory 221 will appear successively upon the output leads 312 and 300 during separate portions of each bit period and will be compared with the bit currently being received in the FSK signal. It is to be noted that marks from both memory sections A and B appear on lead 312 and spaces from both memory sections A and B appear on lead 300.

In the particular structure shown in FIG. 6*a* the character decoder has the capability of selecting one of 16 words. Accordingly, both section A and section B of memory 221 have only 16 8 bit words stored therein, for a total of 32 words. it is apparent that the capacity both of section A and section B of memory 221 can be increased substantially and successful accessing thereof can be made by simply increasing the count capacity of binary counter 212 and also the capacity of selector decoder 215.

Similarly the words having more or less than eight bits can be employed in the system simply by changing the capacity of the three stage binary counter 211 and the characteristics of the bit selector decoder 213.

III. D. THE BIT COMPARISON LOGIC

The logic within the rectangular block 281 of FIG. 6*a* functions generally to compare each received bit of the FSK signal with the corresponding bit stored in the two addresses of sections A and B of memory 229. More specifically, the received bit can be either a mark or a space and accordingly will have set either flip-flop 166 or 185 of FIG. 6. If said received bit is a mark then flip-flop 166 will have been set and the output thereof supplied via lead 167 of FIG. 6 to one input of NAND gate 240 of FIG. 6*a*. On the other input lead 312 to NAND gate 240 there is supplied the mark output from the memory 221. Depending on which of the two addresses in memory 221 is being processed the mark output on lead 312 can contain the bit from the first address stored in memory 221 or the second address stored in memory 221. As discussed before the corresponding bits in said two addresses are compared with the received bits during each bit period under control of the phase generator 197 of FIG. 6.

The output of NAND gates 240 and 241 are both normally at a high level in the condition of mismatch or non-coincidence, of the received bit and the compared bit. More specifically the outputs of NAND gates 240 and 241 will both normally be at a high level so as to produce a low level output at the output of NAND gate 244, indicating a mismatch of the received bit and the compared bit. It is necessary for both of the outputs of either NAND gate 240 or NAND gate 241 to simultaneously rise to a positive value to indicate a matching condition and thereby change the output of either NAND 240 or 241 to a low level which in turn will change the output of NAND gate 244 to a high level indicating that a match has occurred. At the proper time a clock pulse will sample the output of 244 and register the fact of a matched (coincident) condition.

Thus, if a mark is received by the receiver, the flip-flop 166 of FIG. 6 will set and the high level output therefrom will be supplied to one input of NAND gate 240 in FIG. 6*a* via lead 167. If the corresponding bit in the address in memory 221 being compared is also a mark then a high level signal will be supplied via lead 312 to the other input of NAND gate 240, to produce a low level output signal at the output thereof. This low level signal will be supplied to NAND gate 244 and the output thereof will assume its high level, indicating a matched condition. The high level output of NAND gate 244 is inverted by inverter 313 to produce a low level signal which is supplied to one input of NAND gate 251. Upon the occurrence of a $P_1$ pulse, which is positive in nature, the output of NAND gate 251, which has been at a high level, will remain at a high level and thereby will not change the setting of flip-flop 256. It is to be noted that flip-flop 256 is designed to change states in response to low level signals, and further, that flip-flop 256 is employed when comparing the bit of the address stored in section A of memory 221. When the bits of the address stored in section B of memory 221 are being compared with the received bit, NAND gate 252 and flip-flop 257 are employed. The current discussion will be limited to the comparison of the bits of the address stored in section A of memory 221.

It is to be noted that flip-flop 256 is reset by the main reset pulse at the beginning of each received FSK signal and that such reset condition will be maintained as long as coincidence exists between the received bit and the bit of the address being compared. It is only when a mismatch occurs that the output of NAND gate 251 will be at a low level so as to set flip-flop 256 and thereby establish that the received address in the FSK signal is not coincident with the address stored in section A of memory 221.

The case where mismatch occurs will now be described. Assume that the received bit in the FSK signal is a mark and is supplied to NAND gate 240 of FIG. 6a as a positive pulse. Assume also that the bit in the address stored in section A of memory 221 is a space, rather than a mark, so that a low level signal is supplied to the other input 312 of NAND gate 240. Thus the normally high level output of NAND gate 240 will remain at its high level. Since the received bit from the FSK signal is a mark the space input 186 to NAND gate 241 by definition is at its low level so the output of NAND gate 241 is also at its high level. Accordingly the output of NAND gate 244 remains at its low level which, when inverted by inverter 313, becomes a high level signal. Such high level signal is supplied to one input of NAND gate 251. Upon the occurrence of the $P_1$ pulse, which is a high level pulse, the NAND gate 251 will produce a low level signal which will function to set flip-flop 256, thereby indicating that a mismatch has occurred.

Once flip-flop 256 is set it will remain set for the entire duration of the train of received bits in the FSK signal and until a main reset pulse occurs. Accordingly, NAND gate 270 can never become enabled during the remainder of the received FSK signal, thereby remembering that address A is not coincident with the address being received.

It should be kept in mind, however, that it is possible that coincidence will exist between the received address and the address stored in section B of memory 221. If such coincidence does occur an enable pulse will be generated through logic including NAND gate 252, flip-flop 257, NAND gate 271, NAND gate 272, NAND gate 273 and flip-flop 274 in a manner to be described below.

At time $P_5$ the corresponding bit of the address stored in section B of memory 221 is supplied to the NAND gate 240 and 241. At this time, that is, during pulse $P_5$ the logic compares the received bit with the corresponding bit of the address stored in section B of memory 221 and if a match occurs, and assuming the match to be one of mark bits, the output of NAND gate 244 is at its high level. Such high level is inverted by inverter 313 to a low level. NAND gate 252 responds to such low level pulse to have its high level output remain unchanged, thereby effecting no change in the reset condition of flip-flop 257. If coincidence between the received bit of the FSK signal and the remaining bits of the memory stored in section B of memory 221 continues the flip-flop 257 will remain in a reset condition and, at the end of the received address, when the stop code occurs and is recognized, the NAND gate 273 will be enabled by virtue of the reset condition of flip-flop 259 and the reset condition of flip-flop 259, which indicates the recognition of a stop code. Such reset conditions are reflected through NAND gates 271, 272, 273 to produce a set flip-flop 274 and produce an enable signal on enable output lead 295. A more detailed discussion of the logic for recognizing the occurrence of a stop code is set forth in the following section.

III. E. GENERATION AND COMPARISON OF THE STOP CODE

As discussed above, in order to determine whether a received address is identical with one of the two addresses stored in memory 221 it is necessary to determine when the end of such addresses occur. Such determination is implemented by means of a stop code which is an eight bit code occurring at the end of the received address and also occurring at the end of each of the two addresses stored in memory 221. Coincidence of the stop code at the end of the received address and one of stored addresses must occur in order to complete the recongnition of the received address. However, some additional means is required in order to identify the fact that a stop code has occurred. Such identification of the stop code is implemented by the local generation of a stop code at the local receiver. This eight bit locally generated stop code is repeated every eight bits. To provide proper synchronism the first stop code is initiated with the first received bit of the FSK signal. Such locally generated stop code is then compared with each eight bit byte of the two addresses in local memory which are being compared with the received address. When coincidence of the locally generated stop code with the stop code at the end of a locally stored address occurs, the logic will then determine if coincidence has also occurred between said locally stored address and the received address in the FSK signal. If both coincidences occur, the recognition of the received address is completed and the flip-flop 274 of FIG. 6a is set, thereby producing an enable pulse on enable output lead 295 which, as discussed in the following section III-F, functions to admit the immediately following message contained in the FSK signal into the serial-parallel shift register 331 of FIG. 6b.

The locally generated stop code, which consists of the following code, 01000000, is generated in the following manner and by the following logic. Such code is generated by connecting bit 1 of the eight bit selector coder 213 of FIG. 6a to an input of NAND gate 242 through inverter 301 and directly to one input of NAND gate 243. The output of bit selector decoder 213 takes the form of low level pulses so that the inverter 301 is required in order to supply a mark-indicating high level input to NAND gate 242.

Thus, the input to NAND gate 242 is the stop code 01000000 with the binary 1 being represented by a low level signal. The inverse of the stop code is supplied to an input of NAND gate 243 with the spaces being represented by high level pulses. Such inverse stop code is as follows: 10111111. As is the case throughout the receiver the marks and spaces are treated by separate logic and each is represented by a positive pulse. The marks from the stored address in section A of memory 221 is supplied via lead 312 to the other input of NAND gate 242 and the spaces from said address in section A are supplied to the other input of NAND gate 243 via lead 300, also as positive pulses. Coincidence of marks (high level pulses) supplied to the inputs of NAND gate 242, or spaces (high level pulses) supplied to the two inputs of NAND gate 243, will result in the output of either of said two NAND gates 242 or 243 to assume a low level from their normally high level state. The NAND gate 245 will respond to the fact that one of its inputs has a low level thereon to produce a high level output, indicating a match. Such high level signal is inverted by inverter 282 and supplied as a low level signal to NAND gates 253 and 254. The NAND gates 253 and 254 will accordingly be unable to pass a pulse to either the flip-flop 258 or the flip-flop 259 to change the statuses thereof.

Thus, in case of the locally generated stop code, long as coincidence occurs, the status of the flip-flops 258 and 259 will remain in the reset condition. It is only upon the occurrence of a mismatch that one of the flip-flops 258 or 259 will become set. It is also to be understood that flip-flop 258 is employed when comparing generated stop code bit with the address stored in section A of the memory 221, and flip-flop 259 is utilized when comparing the generated stop code bit with the corresponding bit of the address stored in section B of memory 221.

Assume now the case where a mismatch occurs when comparing the locally generated stop code bit with a bit from the address stored in section A of memory 221. Assume further that the mismatch occurred as a result of the third bit from address A being a binary 1 whereas the third bit of the stop code is a binary 0, as defined above. From section A of the local memory 221 a high level pulse will be supplied via lead 312 to an input of NAND gate 242 and a low level pulse will be supplied from the local memory via lead 300 to an input of NAND gate 243. From the locally generated stop code source 213 a low level pulse will be supplied to the other input of NAND gate 242 and a high level pulse will be supplied to the other input of NAND gate 243. Thus each of NAND gates 242 and 243 will have a high level and a low level pulse supplied to the two inputs thereof so that the outputs of both NAND gates 242 and 243 will be at a high level. Such two high level outputs function to produce a low level output at the output of NAND gate 245. Said low level output is inverted by inverter 282 and appears as a high level output at one input of NAND gate 253. When the phase pulse $P_1$ occurs the NAND gate 253 will pass a low level pulse to set flip-flop 258, thereby establishing that noncoincidence has occurred between the stop code currently being generated and the address in memory whose bit is being compared.

At the end of each eight bit locally generated stop code the two flip-flops 258 and 259 are reset in preparation for the comparison of the next locally generated stop code. Such resetting of flip-flops 258 and 259 is accomplished by means of NAND gate 285 which has two inputs thereto. One of such inputs is front bit $B_0$ of the bit selector decoder 213. The other input is phase pulse $P_0$ which is supplied as a low level pulse through inverter 284 to become a high level pulse. The high level pulses on both inputs the NAND gate 285 will provide a negative pulse via lead 286 to the reset inputs of flip-flops 258 and 259, thereby resetting said flip-flops, in preparation for the comparison of the next locally generated 8 bit stop code. It is to be noted again that each bit of the locally generated stop code is compared twice during each nominal bit period of the received FSK signal. One such comparison occurs when the address stored in section A of memory 221 is accessed, and the other comparison occurs when the address stored in section B of memory 221 is accessed. The two comparisons occur respectively at phase function time intervals $P_1$ and $P_5$, which phase function pulses are supplied to NAND gates 253 and 254 via inverters 250 and 303 respectively in FIG. *6a*.

III. F. RESULT OF COINCIDENCE OF A RECEIVED ADDRESS WITH A STORED ADDRESS

When coincidence occurs between a received address and a stored address, including coincidence of the stop code and also the recognition of the generation of said stop code, one of the flip-flops 256 and 257 and one of the flip-flops 258 and 259 will have remained in a set condition. Assume, for example, that coincidence between address stored in section A of memory 221 with the address in the FSK signal has occurred and that the stop code has been recognized. In such a case flip-flop 256 and flip-flop 258 of FIG. *6a* will both be in a set condition, simultaneously with high level signals appearing at the outputs thereof. The NAND gate 270 will respond to such two high level outputs to supply a low level signal to NAND gate 272. The two inputs to NAND gate 272 are normally at a high level so that it's output is normally at a low level. When the output of NAND gate 270 drops to a low level the output of NAND gate 272 will rise to a high level, thereby conditioning NAND gate 273 to be come enabled when its other lead also goes to a high level. Said other lead also goes to a high level. Said other lead will go to a high level when certain conditions are met at the input of NAND gate 292. Such conditions are that phase pulse $P_6$ shall occur during the occurrence of the count of seven from three stage binary counter 211, indicating that the eighth bit of the word has occurred.

Upon coincidence of pulse $P_6$ and the count of seven in counter 211 the NAND gate 292 will supply a low level output pulse, which will become inverted by inverter 293 and be supplied as a high level to the other input of NAND gate 273 via lead 297.

NAND gate 273 will respond to such high level pulses on both its inputs to produce a low level signal at its normally high level output. Such low level signal will set flip-flop 274 and generate a message enable pulse on output lead 295.

III. G. DISCUSSION OF LOGIC FOR RECEIVING MESSAGE AFTER RECOGNITION OF VALID ADDRESS

The enable pulse is supplied to an input of NAND gate 322 of FIG. 6*b*, indicating that the correct address has been received and recognized. Upon the occurrence of the phase pulse $P_3$, which is also supplied to NAND gate 322 through inverter 340, the NAND gate 322 will be energized to supply a low level pulse to flip-flop 325 through lead 323 and to energize and shift the serial-parallel shift register 331 through lead 324. The received mark bits are supplied to the shift register 331 from the output of flip-flop 166 of FIG. 6 via lead 167. After the occurrence of the enable pulse on lead 324 to shift register 331. In the event that the received bit is a space, nothing is entered into the shift register since the absence of a mark indicates the presence of a space in the shift register.

After the eighth bit has been received following the successful recognition of the address, the data stored in shift register 331 is transferred into the latch strobes 330 and 329 via the two groups of four leads 336 and 335. The gating of such data eight bits in parallel into the latch strobes 330 and 329 is accomplished by means of the enabling of NAND gate 326 to produce an output signal which is inverted by inverter 327 and is supplied via lead 328 as a high level pulse to energize gates (not shown) within latch strobes 330 and 329. Enabling of NAND gate 326 is accomplished by a pulse which originates at the output of NAND gate 292 of FIG. 6*a*. More specifically, after the eighth bit following the address has been received in the shift register 331 the count of seven from counter 211 of FIG. 6*a* will be supplied to one input of NAND gate 292 through inverter 291 as shown in FIG. 6*a*. It is to be noted that the count of seven in the bit counter 211 actually represents the reception of the eighth bit since the first bit is numbered zero. Then when the phase pulse $P_2$ occurs the or gate 290 will supply a high level pulse to the other input lead of NAND gate 292, thereby producing a low level pulse from NAND gate 292. Such low level pulse is inverted by inverter 293 and supplied as a high level pulse via lead 294 into the one input of gate 326 in FIG. 6*b*. The other input to NAND gate 326 is also at its high level since the flip-flop 325 has been previously set by the occurrence of the enable pulse on leas 295.

The eight bit word stored in the two latch strobes 330 and 329 is then presented to the driver amplifiers 340 to 347 in the input-output bus driver 355 of FIG. 6*b*.

In the event that eight consecutive message bits are not received following a recognized address, the receiver will reject the message. The logic for such rejection is as follows. In order for the eight bit word stored in shift register 331 to be supplied to the latch strobes 330 and 329 of FIG. 6*b*, it is necessary, as discussed above, that the bit counter 211 reach the seventh count since said seventh count is necessary to energize the NAND gate 292 in FIG. 6*a*, which in turn will, through the logic described above, enable latch strobes 330 and 329. Bit seven of the three stage binary counter can only be reached if eight bits are received since the counting of counter 211 is controlled directly by the reception and recognition of a valid bit. Such valid bit is necessary in order for the function generator 197 to generate phase pulse $P_7$, as discussed hereinbefore.

If said count of seven is not reached by binary counter 211 it necessarily follows that there had been a gap in the transmission of data. As discussed above, any such gap exceeding one bit period, which is equal to one microsecond, will result in a resetting of the entire logic. Such resetting logic will now be discussed in the following section.

III. H. DESCRIPTION OF MAIN RESET LOGIC

A block 356 in FIG. 6 represents the logic for regenerating the main reset pulse generally. It can be seen that there are four input leads to the reset logic block 356 and one output lead 198 therefrom.

Of the four input leads, the leads 358 and 360 respectively supply the raw d-c pulse train of marks and spaces, respectively, to the reset logic 356. The lead 192 supplies the sixteen megahertz clock pulses to reset logic 356 and the lead 199 supplies a reset-to-zero pulse to reset logic 356.

The reset logic is designed so that the absence of a d-c level representing either a mark or a space for more than one nominal bit period as represented by sixteen clock pulses being supplied to reset logic 356 via lead 192, will result in the generation of a main reset pulse on output lead 198. Each time a valid mark or space pulse is received, as evidenced by the setting of either mark-representing flip-flop 166 or space-representing flip-flop 185, the or gate 199 will function to supply such a reset-to-zero pulse to the main reset logic 356 so that the counting of the 16 megahertz clock pulses will begin anew from zero. More specifically the reset logic 356 contains a counter which in fact does count the received 16 megahertz clock pulses. If 16 of such clock pulses are received consecutively the main reset pulse is generated on output leas 198.

Reference is now made to FIG. 8 which shows in detail the reset logic. In FIG. 8 the two input leads 360 and 358 to NAND gate 62 carry the trains of raw space and mark indicating pulses respectively. In the absence of either a valid mark or space indicating pulse the voltage level of the two leads 360 and 358 is high so that the input-output from NAND gate 362 is normally at a low level.

Such normally low level at the output of NAND gate 362 is inverted by inverter 363 and supplied as a normally high level to NAND gate 364. Also supplied to NAND gate 364 are clock pulses from clock pulse source 197. Thus, in the absence of the receipt of a valid mark or space pulse the clock pulses from source 190 of FIG. 6 will be gated through NAND gate 364 of FIG. 8 and then through an inverter 365 into a four bit counter 367, which counts from zero to fifteen. The receipt of fifteen clock pulses by counter 367 will produce binary 1's on each of the four output leads 369 indicating that counter 367 contains a count of 15 . The NAND gate 368 responds to such count of 15 to generate a main reset pulse on its output lead 198. As discussed hereinbefore said main reset pulse functions to reset various flip-flops and counters in the system in preparation for the receipt of the next received data pulse in the FSK signal.

Returning again to the consideration of the logic NAND gates 362 and 364 and inverter 363 it can be seen that in the event that either a valid mark or space pulse is received, the level of either input lead 360 or 358 will drop from a high to a low value thereby causing the output of NAND gate 362 to assume its high value. Such high value is inverted by inverter 363 to produce a low value signal which is supplied to NAND gate 364. NAND gate 364 is thereby disabled by such low level signal and functions to prevent any clock pulses from passing therethrough and into counter 367, thus inhibiting further incrementing of the count content.

When such a valid mark or space data bit is received a reset pulse is supplied via lead 199 to the counter 367 to reset such counter to zero. It is apparent that if a valid space or mark is received during every each consecutive microsecond bit period the four bit counter 367 can never reach a count of fifteen and therefore cannot cause generation of a main reset pulse. it is only when a gap of one microsecond occurs, i.e., neither a valid mark or a valid space is received by the system, that sufficient 16 megahertz clock pulses can be supplied via NAND gate 364 into the four bit counter 367 to cause said counter to attain a count of fifteen and thereby generate the main reset pulse.

The NAND gate 362 functions generally as an or gate in that either a space must appear on input lead 360 or a mark on input lead 358 in order to produce positive output from NAND gate 362. Furthermore, because of the exclusivity feature of the NAND gates 152 and 153 and the inverters 154 and 155 of FIG. 6, whereby it is impossible to obtain mark and space indications simultaneously at the outputs of NAND gates 152 and 153, the overall effect is the creation of an exclusive or function at the output of NAND gate 362. More specifically it is impossible to have negative pulses on input leads 360 and 358 simultaneously since this would imply the simultaneous reception of mark and space pulses.

III. I. DESCRIPTION OF THE PHASE FUNCTION GENERATOR

Consider now the function of the phase generator 197 of FIG. 6. As discussed in connection with FIG. 5, the phase generator 197 will generate successive outputs on its eight output leads 196. These eight output leads are individually identified as PO, P1, P2 P3, P4, P5, P6 and P7, which are energized successively and exclusively, and each of which operates to perform a certain function in the logic of FIGS. 6, 6a and 6b, as set forth in the chart of FIG. 5a.

Generally speaking, the first four functions PO through P3 function to process the received data bit and to effect a comparison of said received data bit with the corresponding data bit in the first unique address stored in section A of memory 221 of FIG. 6a.

The second four phase generator outputs P4 through P7 function generally to compare each received data bit with the corresponding bit in the address stored in section B of memory 221.

There are however, some distinctions betwen the operation of the first four phase output terminals PO through P3 and the second four output terminals P4 through P7. These differences will be discussed in the following paragraphs.

Before a bit or a mark is received the phase generator 197, which is essentially a decimal counter rests on the count of 0, with a low level output signal present on output lead PO. Such output from PO is connected to an input of NAND gate 194 and functions to inhibit NAND gate 194, thereby preventing clock pulses from source 190 from passing through said NAND gate 194 and into phase generating counter 197.

Upon the reception of a valid mark or space bit, an output pulse will be generated by either up-down counters 163 or up-down counter 183 as it passes from count 15 to count 0. Such output pulse will pass through or gate 177 and then through lead 178 to an input of NAND gate 179 as a low level signal. Since the other input of NAND gate 179 is normally at a high level, the low level input from counter 163 or 183 will pass through NAND gate 179 and move the count of counter 197 from 0 to 1, thereby removing the inhibiting pulse PO from the input of NAND gate 194. Once the low level inhibiting pulse is removed from NAND gate 194, and a high level signal established thereon, the high level pulses from the clock source 190 will function to produce a train of low level pulses at the output of NAND gate 194. Such low level pulses will pass through NAND gate 179 and appear at the output of NAND gate 194 as a train of high level pulses. Such train of high level pulses will count decimal counter 197 through its full count capacity and back to the count of 0. The count capacity of counter 197 is 8, as can be seen from FIG. 6.

Since the clock pulse rate is 16 megahertz, each of the output terminals PO to P7 of phase generator 197 will be energized for one sixteenth of a microsecond. During each of these eight phase intervals certain functions are performed in the logic in accordance with the chart of FIG. 5a. When the count of counter 197 recycles back to 0 the NAND gate 194 is again disabled to prevent any additional clock pulses from being supplied therethrough. At this point the processing of the received data bit is completed and the proper determination has been made as to the coincidence of such received bit with the corresponding bits of the two addresses stored in sections A and B of the receiver memory, the determination has been as to whether the end of the address has occurred, and if so, then the enablement of the proper gating means for receiving the ensuing message has been effected.

A detailed consideration of the function of each of the eight phases of the phase generator 197 of FIG. 6a follows.

P0. In this phase the system is essentially at rest and is awaiting the reception of a valid mark or space bit as evidenced by an output from either the counter 163 or 183 of FIG. 6. And section A of memory 221 is accessed by means of the access addressing means 210 of FIG. 6a in the manner discussed above in section III-C.

P1. In this phase a valid mark or space has been received. The NAND gates 251 and 253 of FIG. 6a are conditioned by P1 to pass a high level output occurring at the output of NAND gate 244 or NAND gate 245, respectively, representing coincidence between the received and stored address bits, or between the generated and stored stop code bits. A high level signal from NAND gates 251 or 253 will not set flip-flops 256 or 258.

As will be recalled from prior discussion, a high level output signal from NAND gate 244 indicates that a mismatch or non-coincidence has occurred in the received bit and the corresponding bit of the stored address. On the other hand a low level output from NAND gate 244 represents a match or coincidence between the received and corresponding stored bit.

In the case of coincidence, the high level signal is supplied to one input of NAND gate 251. Then upon the occurrence of the phase pulse P1, which is a low level signal and which is applied to the other input of NAND gate 251, will remain at its high level so that flip-flop 256 will remain in its reset condition.

On the other hand, if a mismatch has occurred between the received and the stored bit then the output of NAND gate 244 will be at its high level and such high level will be supplied to one input of NAND gate 251. Subsequently, when the phase pulse P1 occurs, also a high level signal after inverter 250, the output of NAND gate 251 will be at a high level which will function to change the condition of flip-flop 256 from its reset condition to its set condition, thereby indicating a lack of coincidence.

However, this lack of coincidence pertains only to the address stored in section A of memory 221. The received bit is also compared with the corresponding bit of the address stored in section B of memory 221, by a later phase pulse P5, as will be described later herein.

Returning now to the condition of mismatch with respect to the first address, the setting of flip-flop 256 will function to inhibit any output signal from NAND gate 270 during the currently received bit or during any subsequent bit received during the train of incoming bit pulses being processed. As will be seen later it will be necessary for a reset pulse to occur before the flip-flop 256 can be reset and the NAND gate 270 unblocked.

P2. During phase P2 section B of memory 221 is accessed. Such accessing of section B of memory 221 is accomplished by changing the state of flip-flop 218 in FIG. 6*a*. More specifically the pulse P2 is supplied to flip-flop 218 to change the phase thereof so that output 220 of flip-flop 218 is energized to access section B of memory 221. The access logic, including the three stage binary counter 211, the four stage binary counter 212, the bit selector 213 and the character selector decoder 215, functions to select specific character in section B of the memory and a specific bit in the selected character. Depending on whether the selected bit is a mark or a space, it will next be supplied via output lead 300 or 312 to the NAND gates 240 and 242 or 241 and 242 of bit comparitor circuits 281 and 280 in preparation for bit comparison at phase P5.

Also at phase P2 the logic can be tested to determine if a complete address has been received. Such test is made by supplying the low level P2 pulse through an input NAND gate 290, whose two inputs are normally at a high level and the output thereof normally low. The supply of a low level P2 pulse to NAND gate 290 produces a high level output which is then supplied to NAND gate 292. Also supplied to the other input of gate 292 is a high level pulse which is derived from the count of seven of bit counter 211 of FIG. 6*a*. Bit seven is in fact the eighth bit of an eight bit word so that the test for completion of the address occurs at the reception of every complete eight bit word.

The coincidence of two high level pulses to the two inputs of NAND gate 292 results in a low level pulse therefrom which is inverted by inverter 293 and then supplied via lead 294 to NAND gate 273 as a high level pulse. If, in fact, a complete address has been received, the output of NAND gate 272 will be a high level pulse so that NAND gate 273 will in turn produce a low level pulse which will set flip-flop 274 and generate an "enable" status.

P3. The phase P3 is employed to shift the marks stored in shift register 331 after the occurrence of a message enable pulse from flip-flop 274 of FIG. 6*b*.

P4. Phase P4 is primarily a delay time interval during which the logic for accessing the address stored in section B of memory 221 is permitted to complete its accessing of said section B address.

P5. The function of the phase P5 pulse is similar to that of phase P1 except that it is in connection with the address stored in section B of memory 221 rather than in section A. More specifically, in phase 5 the output of NAND gate 244 in FIG. 6*a* is examined to determine if said output indicates a match or a mismatch of the received bit with the corresponding bit in the address stored in section B of memory 221 and to then gate said decision through NAND gate 252 into flip-flop 257. If a mismatch occurs, there will be a high level output from inverter 313 and the normally low level P5 pulse will be inverted by inverter 303 to provide another high level pulse so that both inputs to NAND gate 252 will be high level pulses which will produce a low level output therefrom. The flip-flop 257 will be set by said low level pulse indicating that a mismatch has occurred. Such indication of a mismatch will remain stored in the flip-flop 257 until reset occurs. Thus at this point in time the logic of FIG. 6*a* has irretrievably rejected the incoming address as coinciding with address stored in section B of the local receiver memory 221.

The phase pulse P5 is also supplied to the NAND gate 254 along with the stop code comparison logic 280 and will function to set flip-flop 259 in the event of a mismatch between the locally generated stop code bit and the corresponding bit of address B. As discussed before, once the flip-flop 259 is set to indicate a mismatch, it will remain set until the completion of the generation of the eight bit stop code word, at which time flip-flop 259 will be reset by a pulse from NAND gate 285 so that the next eight bit stop code generated locally can be compared on a bit-by-bit basis with the next eight bits of the local address stored in section B of the memory.

P6. During phase P6 the logic of FIG. 6*a* is tested to determine if the received address is complete and if it is in fact the address of a local receiver. Such testing of the incoming address is made by means of logic including NAND gate 292. More specifically the low level pulse P6 is supplied to one of the two normally high inputs of NAND gate 290 to produce a positive pulse at the output thereof. Bit seven, which represents the eighth and last bit of the locally generated stop code is supplied from binary counter 211 to the other input of NAND gate 292 through inverter 291. The output of NAND gate 292, which is a low level pulse, is inverted by inverter 293 and supplied as a high level pulse to one of the two inputs of NAND gate 273. If the other input of NAND gate 273 is also high level, which indicates the successful and complete coincidence of the received address with the stored address in section B of the local memory and also the coincidence of the stop code at the end of both the received and stored addresses, then NAND gate 273 will produce a low level signal which will set flip-flop 274 and provide a message enable pulse on output lead 295.

P7. Phase P7 functions to reset the mark and space received-indicating flip-flops 166 and 185 and the flip-flop 218 of FIG. 6*a* whereby section A of memory 221 is again accessed. Pulse P7 also increments three stage binary counter 211 of FIG. 6*a* by one in preparation for accessing the next successive bit in the addresses stored in both sections A and B of memory 221.

Upon the occurrence of the next phase pulse P0 the NAND gate 194 of FIG. 6 becomes inhibited thereby so that no more clock pulses from source 190 can be gated into the phase generator 197 until the occurrence of the next valid received mark or space bit.

III. J. DESCRIPTION OF FUNCTION AND OPERATION OF UP-DOWN COUNTERS

As discussed above in section III-B in connection with FIG. 6 the general function of the up-down counters 163 and 183 is to perform a time integration function upon the received marks and spaces, respectively.

Since both of the up-down counters 163 and 183 operate essentially the same, except that counter 163 pertains to marks and counter 183 pertains to spaces, the following discussion will be limited to the function of counter 163.

The counter 163 has a total count capacity of 16 positions and counts in an up direction from 0 to 15 in pure binary (0000 to 1111) and then from 15 it recycles back to 0 and then again counts consecutively up to 15.

Similarly when counting in the reverse direction, counter 163 counts down to 0. Then the next count will cycle the counter to 15 and then it will count downwards towards 0 again.

Normally the counter 163 sits at the count of eight and will count forward at a clock rate of 16 megahertz only during the existence of a mark pulse as evidenced by a negative output from NAND gate 161 in FIG. 6.

When the count of counter 163 goes from 15 to 0 an output will be generated therefrom and supplied to said flip-flop 166. In the absence of a mark-indicating output from NAND gate 161 there will be a corresponding low level output from the NAND gate 162 which will cause counter 163 to count in the reverse direction. Such counting in the reverse direction will continue until the counter reaches a count of eight at which time a status pulse will be supplied from counter 163 to NAND gate 162 via lead 164 to disable said NAND gate 162 and prevent further clock pulses from passing therethrough and thereby inhibit further reverse counting.

Referring now to FIG. 9 there is shown a waveform of received marks and spaces and also the counting occurring in counter 163 as a result of the receipt of such marks and spaces. More specifically the waveform C shows the clock pulses supplied into counter 163 upon the receipt of valid mark bits. The group of clock pulses 375 are supplied into counter 163 via NAND gate 161 when the valid mark bit 379 in waveform B is received and occurs at the output of NAND gate 161. It is assumed that the mark bit 379 is a full microsecond in duration so that the counter 163 will count from its count of eight completely around a full cycle and back to the count of eight as indicated by the group of pulses 375.

During the time period $t_{11} - t_{12}$ no mark space is received. However, since the counter 163 was left at the count of 8 at the termination of mark bit 379 there will be no count in the reverse direction in counter 163. Assume, however, that the next mark bit to occur, which bit is designated by reference character 201, does not occupy a full 1 microsecond bit period. The group of pulses 376 shown in waveform C of FIG. 9 illustrate what happens in the up-down counter 163 of FIG. 6 as a result of the short mark pulse 201 in waveform B. The counter starts from the count of 8 and counts in a forward direction until the mark pulse 201 terminates. At this time, as can be seen from the group of counts 376, the counter has counted forward through the count of 15 and 0 and back to the count of 4. During the time period 381 in waveform B, when no mark pulse is being received, the counter 163 will count in the reverse direction by virtue of the fact that NAND gate 162 of FIG. 6 is now enabled and will pass the clock pulses from source 190 into the count-down input of counter 163. The group of pulses 377 shows that the counter 163 will count in a reverse direction from the count 4 back down through to 0 and then start immediately at 15 back down to a count of 8, which occurs just shortly after time $t_{28}$. At this count of 8 the NAND gate 162 of FIG. 6 will be disabled by virtue of the signal supplied thereto from counter 163 via lead 164.

Thus at the occurrence of the next mark pulse 382 at time $t_{14}$ the counter 163 will be sitting at a count of 8 and will proceed to count forward during the duration of said next mark pulse 382.

It should be noted that the short duration mark pulse 201 was caused by a distortion in the received FSK signal as witnessed by the shaded portion 200 of waveform A. Such distortion might result in the simultaneous reception of both mark and space-representing frequencies or it could be the absence of both frequencies during such period. For the same reason the space pulse 383 of waveform E is of a duration shorter than the nominal bit period of 1 microsecond.

In waveform E which represents the train of raw space pulses appearing at the output of NAND gate 181 of FIG. 6 the effect of one of said pulses identified by reference character 202 upon the space up-down counter 183 is shown.

More specifically the group of clock pulses 378 in waveform F illustrate the counting occurring in the up-down counter 183 as a result of the occurrence of space pulse 202. It can be seen that counter 183 starts from the count of 8 and then counts forward to 15 and then recycles back to 0 at the next count, and then counts back up to a count of 8.

It is to be understood however, that the count 202 is shown as having a duration of a full microsecond so that counter 183 can count through a complete cycle and finish at the count of 8.

Limitations on the duration of each received data bit can be seen from an examination of the waveform E. More specifically the four consecutively received space pulses are each of a shorter duration of one microsecond and have time gaps therebetween as identified by reference characters 392, 393 and 394. It will also be noted that the durations of the pulses 389 – 391 are each longer than the time gap 392 through 394. Therefore during the existence of each of the pulses 388, 389 – 391 the counter 183 of FIG. 6 will count in a forward direction but will not count through a full cycle of the counter, that is through a full 16 counts. Since the time gaps 392, 393 and 394 are shorter than the space pulses 388 – 399 it is obvious that the counter 183 will not be able to count backwards as far as it counted forward during the preceding space so that the counter will not count back to a count of eight. Thus there will be an accummulating count error occurring in the counter 183 during the reception of the four mark or space bits 388 – 391. At the point where the counter is not able to count in a reverse direction back through to at least the count of 15 before the next space bit occurs the said next occurring space bit will not produce an output from the counter 183 since it will not cause the counter 183 to count through from 15 to zero.

The coding and word arrangement of the particular embodiment of the invention described herein is such that no more than seven consecutive marks can occur. Thus, assuming that seven consecutive spaces were to occur, and further assuming that all of the space pulses were of the same length but shorter than 1 microsecond it is apparent that each space pulse can only create a counting error of not more than one count in the up-down counter.

It is to be understood that the form of the invention shown and described herein is but a preferred embodiment thereof and that various changes can be made in the logic arrangement and the components without departing from the spirit and scope thereof.

What is claimed is:

1. A digitalized means for reproducing mark and space representing pulses from an FSK signal, having first segments thereof at a first frequency and representing binary 1's, and second segments thereof at a second frequency and representing binary 0's, and further having a nominal bit rate $R_b$, and comprising:

first and second data channels;

demodulating means responsive to said first and second segments of said FSK signal to produce first and second two level signals, respectively, in said first and second data channels, respectively;

first gating means responsive to the simultaneous presence of a first level of said first two level signal and the absence of the first level of said second two level signal to produce a first output signal in said first data channel;

second gating means responsive to the simultaneous presence of the first level of said second two level signal and the absence of the first level of said first two level signal to produce a second output signal in said second data channel;

first digitalized time measuring means for determining if the duration of said first output signal exceeds a certain time interval;

second digitalized time measuring means for determining if the duration of said second output signal exceeds a certain time interval; and first and second storage means responsive to the determination by said first or second time measuring means, respectively, that said first or second output signal has exceeded said certain time intervals, to assume a state indicative of the reception of a mark or a space, respectively.

2. A digitalized means for reproducing mark and space representing pulses from an FSK signal, having first segments thereof at a first frequency and representing binary 1's, and second segments thereof at a second frequency and representing binary 0's, and further having a nominal bit rate $R_b$, and comprising:

first and second data channels;

demodulating means responsive to said first and second segments of said FSK signal to produce first and second d-c voltages, respectively, in said first and second data channels, respectively;

first gating means responsive to the simultaneous presence of said first d-c voltage and the absence of said second d-c voltage to produce a first output signal in said first data channel;

second gating means responsive to the simultaneous presence of said second d-c voltage and the absence of said first d-c voltage to produce a second output signal in said second data channel;

first up-down counter means having a nominal rest count value and responsive to said first output signal to count in a first direction and to the absence of said first output signal to count in the opposite direction, towards said nominal rest count value;

second up-down counter means having a nominal rest count value and responsive to said second output signal to count in a first direction and to the absence of said second output signal to count in the opposite direction towards said nominal rest count value;

first and second storage means responsive to said first or second counter means, respectively, counting to a given count in said first direction, to assume a state indicative of the reception of a mark or a space, respectively.

3. A digitalized receiving means in accordance with claim 2 comprising:

local memory means having stored therein an accessible address;

first bit comparing means;

control means responsive to the assumption of a given state of said first or second storage means to supply to said first bit comparing means successively occurring bits in said address;

said first bit comparing means constructed to compare each of said successively occurring bits supplied thereto with the data bit just received by said digitalized means to determine coincidence or non-coincidence therebetween;

said control means further responsive to the determination of coincidence between all of the received bits and the bits of said stored address to generate a coincidence acknowledging signal indicating such coincidence; and means responsive to the generation of said coincidence acknowledging signal to enable reception of a predetermined amount of data message following said coincidence acknowledgment signal.

4. A digitalized receiving means in accordance with claim 3 in which each received address and said stored address comprises a start code and a stop code word, and in which;

said control means is constructed to generate a stop code word which is time coincident, bit by bit, with the serial reception of the bits of each word of said received address, and in which said digitalized means further comprises;

second bit comparing means for comparing each bit accessed from said local memory means with the bits of the generated stop code word; and means responsive to the coincidence of said generated stop code word with the received stop code word to generate a stop acknowledgment signal;

said control means being responsive to the concurrent occurrence of said stop acknowledgment signal and said coincidence acknowledgment signal to enable reception of a data message following said stop acknowledgment signal.

5. A digitalized receiving means in accordance with claim 2 comprising;

local memory means having stored therein first and second accessible addresses;

first bit comparing means;

control means responsive to the assumption of a given state of said first or second storage means to supply to said first bit comparing means successively occurring bits in each of said first and second stored addresses;

said first bit comparing means constructed to compare each of said successively occurring bits supplied thereto with the data bit just received by said digitalized means to determine coincidence or non-coincidence therebetween;

said control means further responsive to the determination of coincidence between the received data bits and all of the bits of either said first address or said second address to generate a coincidence acknowledging signal indicating such coincidence; and means responsive to the generation of said coincidence acknowledging signal to enable reception of a predetermined amount of data message following said coincidence acknowledgment signal.

6. A digitalized receiving means in accordance with claim 5 in which each of said received addresses and said stored addresses comprises a start code and a stop code word, and in which;

said control means is constructed to generate a stop code word which is time coincident, bit by bit, with the serial reception of the bits of each word of said received address, and in which said digitalized means further comprises;

second bit comparing means for comparing each bit accessed from said local memory means with the bits of the generated stop code word; and means responsive to the coincidence of said generated stop code word with the received stop code word to generate a stop acknowledgment signal;

said control means being responsive to the concurrent occurrence of said stop acknowledgment signal and said coincidence acknowledgment signal to enable reception of a data message following said stop acknowledgment signal.

7. A digitalized means for selectively receiving, at a nominal bit rate $R_b$, binary coded data contained in an FSK signal, with first portions of said FSK signal being of a first frequency and representing marks and second portions of said FSK signal being of a second frequency and representing spaces and comprising:

first and second data channels;

first and second demodulating means responsive to said first and second portions, respectively, of said FSK signal to produce first and second d-c voltages in said first and second data channels representing said first and second portions of said FSK signal above a predetermined amplitude;

first gating means responsive to the presence of said first d-c voltage in said first channel and the simultaneous absence of said second d-c voltage in said second channel to produce a first output signal;

second gating means responsive to the presence of said second d-c voltage in said second channel and the simultaneous absence of said first d-c voltage in said first channel to produce a second output signal;

first up-down counter means responsive to said first output signal to count in a first direction at a rate $NR_b$, where N is an integer greater than unity, and to the absence of said first output signal to count downwards in the opposite direction at said rate $NR_b$;

second up-down counter means responsive to said second output signal to count in said first direction at said rate $NR_b$ and to the absence of said second output signal to count in said second direction at said rate $NR_b$; and first and second storage means responsive to said first and second counter means, respectively, when said first and second counter means count in said first direction past a given count, to assume a given state indicating a received mark or a received space, respectively.

8. A digitalized means in accordance with claim 7 comprising:

memory means having stored therein first and second addresses;

first bit comparing means;

control means responsive to the assumption of said given state by said first or second storage means to access and supply to said bit comparing means in successively occurring bits in each of said first and second stored addresses;

said bit comparing means constructed to compare each of said successively occurring bits supplied thereto with the bit just received by said digitalized means to determine coincidence or non-coincidence therebetween;

said control means further responsive to the determination of coincidence between all of the bits of either said first address or said second address with all of the time corresponding received bits to generate a coincident acknowledgement signal indicating such coincidence; and means responsive to the generation of said acknowledgment signal to receive a predetermined amount of data message following said acknowledgment signal.

9. A digitalized means in accordance with claim 8 in which each received address and said stored address comprises a start code word and a stop code word, and in which;

said control means is further constructed to generate a stop code word which is time coincident with the accessing of each word of said stored addresses; and in which said digitalized means further comprises;

second bit comparing means for comparing each bit accessed from said stored addresses with the bits of the generated stop code word; and means responsive to the coincidence of said generated stop code word with the stop code of a stored address to generate a stop acknowledgment signal;

said control means being responsive to the concurrent occurrence of said stop acknowledgment signal and said coincidence acknowledgment signal to enable reception of a data message following said stop acknowledgment signal.

10. A digitalized receiving means for selectively receiving and identifying, at a nominal bit rate $R_b$, a binary coded address contained in an FSK type signal and comprised of words, with first portions of said FSK signal being of a first frequency and representing binary 1's and second portions of said FSK type signal being of a second frequency and representing binary 0's and comprising:

first and second data channels;

first and second demodulating means responsive to said first and second portions, respectively, of said FSK signal to produce first and second d-c voltages in said first and second data channels corresponding to the envelopes of said first and second portions of said FSK signal above a predetermined amplitude;

first gating means responsive to the presence of said first d-c voltage in said first channel and the simultaneous absence of said second d-c voltage in said second channel to produce a first output signal;

second gating means responsive to the presence of said second d-c voltage in said second channel and the simultaneous absence of said first d-c voltage in said first channel to produce a second output signal;

first up-down counter means responsive to said first output signal to count in a first direction at a rate $NR_b$, where N is an integer, and to the absence of said first output signal to count downwards in the opposite direction at said rate $NR_b$;

second up-down counter means responsive to said second output signal to count in said first direction at said rate $NR_b$ and to the absence of said second output signal to count in said second direction at said rate $NR_b$;

said first and second counter means having a count capacity of $NR_b$;

first and second bistable means responsive to said first or second counter means, respectively, when said first and second counter means count in said first direction past a given count, to assume a state indicating a received mark or space, respectively;

local memory means containing accessable data bits;

addressing means constructed to access the bits stored in said memory means in a predetermined order and at a predetermined rate $R_b$;

control means for starting the accessing of said memory means with the start of the receipt of said binary coded address;

first comparing means for comparing said received data bits and the data bits accessed from said memory; and means responsive to the coincidence of said compared bits to generate a coincidence acknowledging signal.

11. A digitalized receiving means in accordance with claim 10 in which each received address and said stored address comprises a start code and a stop code word, and in which;

said control means is constructed to generate a stop code word which is time coincident with the serial reception of each word of said accessed stored address; and in which said digitalized means further comprises;

second bit comparing means for comparing each bit accessed from said local memory means with the bits of the generated stop code word, and means responsive to the coincidence of said generated stop code word with the stop code word of a stored address to generate a stop acknowledgement signal;

said control means being responsive to the concurrent occurrence of said stop acknowledgement signal and said coincidence acknowledgment signal to enable reception of a data message following said stop acknowledgment signal.

12. A digitalized receiving means in accordance with claim 10 in which said local memory means has stored therein first and second addresses and further comprising:

said control means being responsive to the assumption of a given state of said first or second bistable means indicative of the receipt of a valid mark or a space data bit by said receiving means to supply to said first comparing means in successive order each next occurring bit in said predetermined order in each of said first and second addresses;

said first comparing constructed to compare each of said next occurring bits supplied thereto with the bit just received by said digitalized means to determine coincidence therebetween or non-coincidence therebetween;

said control means further responsive to the determination of coincidence between all of the bits of either said first address or said second address to generate said coincidence acknowledging signal indicating such coincidence; and means responsive to the generation of said coincidence acknowledging signal to enable reception of a predetermined amount of data message following said acknowledgment signal.

13. A digitalized receiving means in accordance with claim 12 in which each of said received addresses and said stored addresses comprises a start code and a stop code word, and in which;

said control means is constructed to generate a stop code word which is time coincident with the serial reception of each word of said accessed stored addresses;

and in which said digitalized means further comprises;

second bit comparing means for comparing each bit accessed from said local memory means with the bits of the generated stop code word; and means responsive to the coincidence of said generated stop code word with the stop code word of a stored address to generate a stop acknowledgement signal;

said control means being responsive to the concurrent occurrence of said stop acknowledgment signal and said coincidence acknowledgment signal to enable reception of a data message following said stop acknowledgment signal.

* * * * *